United States Patent
Tamura et al.

(10) Patent No.: US 12,371,537 B2
(45) Date of Patent: Jul. 29, 2025

(54) POLYETHER-POLYSILOXANE BLOCK COPOLYMER COMPOSITION, FOAM STABILIZER AND METHOD FOR PRODUCING POLYURETHANE FOAM

(71) Applicant: DOW TORAY CO., LTD., Tokyo (JP)

(72) Inventors: Seiki Tamura, Ichihara (JP); Son Thanh Phan, Ichihara (JP); Hiroyuki Inagaki, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 626 days.

(21) Appl. No.: 17/788,082

(22) PCT Filed: Nov. 12, 2020

(86) PCT No.: PCT/JP2020/042262
§ 371 (c)(1),
(2) Date: Jun. 22, 2022

(87) PCT Pub. No.: WO2021/131378
PCT Pub. Date: Jul. 1, 2021

(65) Prior Publication Data
US 2023/0059761 A1    Feb. 23, 2023

(30) Foreign Application Priority Data

Dec. 25, 2019 (JP) .................................. 2019-234289

(51) Int. Cl.
*C08G 77/46* (2006.01)
*C08G 65/336* (2006.01)
*C08J 3/09* (2006.01)

(52) U.S. Cl.
CPC ............ *C08G 77/46* (2013.01); *C08G 65/336* (2013.01); *C08J 3/095* (2013.01)

(58) Field of Classification Search
CPC .................................................... C08G 77/46
See application file for complete search history.

(56) References Cited

U.S. PATENT DOCUMENTS

| | | |
|---|---|---|
| 3,792,073 A | 2/1974 | Prokai et al. |
| 3,836,560 A | 9/1974 | Prokai et al. |
| 3,920,587 A | 11/1975 | Watkinson |
| 3,957,842 A | 5/1976 | Prokai et al. |
| 4,150,048 A | 4/1979 | Schilling, Jr |
| 4,275,172 A | 6/1981 | Barth et al. |
| 5,869,727 A | 2/1999 | Crane et al. |
| 6,187,891 B1 | 2/2001 | Rautschek et al. |
| 7,645,848 B2 | 1/2010 | Knott et al. |
| 7,825,205 B2 | 11/2010 | Knott et al. |
| 7,825,209 B2 | 11/2010 | Knott et al. |
| 8,309,673 B2 * | 11/2012 | Schubert ............ C08G 65/2639 528/26 |
| 8,791,168 B2 | 7/2014 | Babb et al. |
| 10,717,872 B2 * | 7/2020 | Inagaki ............... C11D 3/0026 |
| 2008/0153995 A1 | 6/2008 | Knott et al. |
| 2019/0233646 A1 | 8/2019 | Nagaki et al. |
| 2020/0048427 A1 | 2/2020 | Phan et al. |
| 2020/0055992 A1 * | 2/2020 | Knott ..................... C08G 77/46 |

FOREIGN PATENT DOCUMENTS

| | | | |
|---|---|---|---|
| JP | H07-090102 A | 4/1995 | |
| JP | H08-156143 A | 6/1996 | |
| JP | 200063523 A | 2/2000 | |
| JP | 2006282820 A | 10/2006 | |
| JP | 5231796 B2 | 7/2013 | |
| JP | 2014-210832 A | 11/2014 | |
| WO | WO-2013074912 A1 * | 5/2013 | ............. A61K 8/894 |
| WO | 2016166979 A1 | 10/2016 | |
| WO | WO-2018074257 A1 * | 4/2018 | ............. A61K 8/894 |

OTHER PUBLICATIONS

English translation of PCT/JP2020/042262 dated Dec. 28, 2020, 2 pages.
Machine assisted English translation of JPH0790102A obtained from https://patents.google.com/patent on Nov. 10, 2022, 7 pages.
Machine assisted English translation of JPH08156143A obtained from https://patents.google.com/patent on Nov. 10, 2022, 7 pages.
Machine assisted English translation of JP2006282820A obtained from https://patents.google.com/patent on Nov. 10, 2022, 7 pages.
Machine assisted English translation of JP2014210832A obtained from https://patents.google.com/patent on Nov. 10, 2022, 7 pages.

* cited by examiner

*Primary Examiner* — Marc S Zimmer
(74) *Attorney, Agent, or Firm* — Warner Norcross + Judd LLP

(57) ABSTRACT

A manufacturing method for a polyether polysiloxane block copolymer composition that can avoid the use and incorporation of aromatic hydrocarbon-based solvents is provided. The manufacturing method is generally easy on an industrial production scale. The manufacturing method includes a step of obtaining a polyether polysiloxane block copolymer (A) by a specific reaction in the presence of a saturated hydrocarbon solvent (C) having an average number of carbon atoms in a range of 6 to 11, and a step of replacing the solvent (C) used in the reaction with (B) a (poly)glycol or a polyglycol derivative diluent, either during or after the aforementioned step. Also provided is a method of manufacturing a foam stabilizer or the like using the composition obtained by the aforementioned manufacturing method.

11 Claims, No Drawings

POLYETHER-POLYSILOXANE BLOCK COPOLYMER COMPOSITION, FOAM STABILIZER AND METHOD FOR PRODUCING POLYURETHANE FOAM

CROSS-REFERENCE TO RELATED APPLICATIONS

This application is the U.S. National Stage of International Application No. PCT/JP2020/042262 filed on Nov. 12, 2020, which claims priority to and all advantages of Japanese Patent Application No. 2019-234289 filed on 25 Dec. 2019, the contents of which are incorporated herein by reference.

TECHNICAL FIELD

The present invention relates to a manufacturing method for a foam stabilizer for polyurethane foam (including functions as a foam control agent and a foam stabilizer; same hereinafter) containing (A) a straight chain polyether organopolysiloxane block copolymer and (B) (poly)glycol or a polyglycol derivative. Furthermore, the present invention relates to an aromatic hydrocarbon-based solvent-free and low VOC/emission foam stabilizer, a polyurethane foam-forming composition, and a method of manufacturing polyurethane foam.

BACKGROUND ART

Straight chain polyether organopolysiloxane block copolymers are known as (AB)n polyether modified silicones, and can be broadly classified as (A1) non-hydrolyzable copolymers in which a polysiloxane portion and the polyether portion are linked by a Si—C bond, and (A2) hydrolyzable copolymers in which the polysiloxane portion and the polyether portion are linked by a Si—O—C bond. Methods of manufacturing (AB)n polyether modified silicones and applications to a foam stabilizer for polyurethane foam have been known for a long time.

Examples 1 to 7 of Patent Document 1 disclose an example of producing (A1) where an (AB)n copolymer is synthesized in toluene solvent by a hydrosilylation reaction of (S1) an organopolysiloxane having an SiH group on both terminals and (E2) a polyether having an allyl group on both terminals, and then obtaining concentrated product by removing the toluene in an evaporator. Furthermore, a 50% toluene solution of (AB)n copolymer is reported as a surfactant for mechanical floss polyurethane foam. Examples 2 and 11 to 24 of Patent Document 2 disclose a surfactant made from a toluene solution obtained by synthesizing an (AB)n copolymer in a toluene solvent by a hydrosilylation reaction of (S1), an organopolysiloxane having an SiH group on both terminals and (E3), a polyether having a methallyl group on both terminals, and then filtering out a catalyst. Patent Document 3 discloses that a concentrated product obtained by similarly synthesizing a copolymer in a toluene solvent and then removing toluene in an evaporator is useful as a surfactant for a semi-hard urethane foam and a flexible hot-molded urethane foam. The surfactant thus obtained uses an aromatic hydrocarbon solvent in manufacturing, so removing all of the solvent, especially on an industrial production scale, is difficult, and therefore it cannot meet the needs of the current polyurethane industry, which requires strict VOC (Volatile Organic Compound) control.

Patent Document 4 discloses an example in which a long chain alkylbenzene solution of (AB)n copolymer is used as a surfactant for mechanical floss polyurethane foam. Long chain alkylbenzenes are less harmful than BTX (benzene, toluene, xylene) solvents, and have long been used as diluents for these copolymers. However, the polyurethane foam obtained using the long chain alkylbenzene solution of an (AB)n copolymer as a surfactant releases a large amount of VOCs, and one of the main causes of this VOC is the long chain alkylbenzene, and therefore it is not possible to comply with the needs of the current polyurethane industry which require strict VOC/emission control. Furthermore, long chain alkylbenzene may be considered a type of aromatic hydrocarbon-based solvent, and there is a problem in that the solvent remains in the urethane foam and migrates (exudes) from the final product.

Patent Document 5 discloses an example where an (AB)n copolymer is synthesized in toluene, PPG (polypropylene glycol) is added, and then the toluene is removed by a stripping operation. Furthermore, it has been reported that when the PPG solution of the (AB)n copolymer thus obtained is used as a foam stabilizer, a mechanical floss (mechanical foaming) polyurethane foam having low VOC can be obtained. The manufacturing of such a foam stabilizer requires the process to proceed while controlling the foaming that occurs in the step of replacing the reaction solvent with a diluent, thereby requiring time, and it is also possible to manufacture using industrial production scale equipment. A bigger problem is the point that it is difficult to remove all of the BTX solvent because an aromatic hydrocarbon solvent is used. Herein, Patent Document 5 specifies that isopropyl alcohol (IPA), toluene, and xylene are the organic solvents that are the reaction solvents when manufacturing the (AB)n copolymer. Therefore, a person of ordinary skill in the art could conceive that a BTX solvent-free foam stabilizer can be obtained by manufacturing the copolymer using IPA, and replacing this for the PPG. However, based on a study by the present inventors, when an (AB)n copolymer is manufactured using IPA as the reaction solvent, significantly more tenacious foaming will occur than the case where toluene is used in a subsequent solvent replacement step with a diluent, and it was found that a boiling phenomenon would readily occur under reduced pressure, so it was extremely difficult to manufacture the foam stabilizer on a laboratory scale by a prescribed process (manufacturing time was 2 to 3 times longer as compared to toluene. Because foaming was severe, only half of the volume could be obtained as compared to the case of toluene.) On an industrial production scale, the manufacturing time is at least two times longer than on a laboratory scale, the occupancy time and productivity of the production device is poor, and when considering cost pressures, safety, and the like, it is usually not practical to produce (AB)n foam stabilizer for polyurethane foam using IPA. In the scope studied by the present inventors, there were no previous reports that IPA is not usable as a reaction solvent when producing the foam stabilizer, and thus, the problem of a practical method for producing an aromatic hydrocarbon-based solvent-free and low VOC/emission (AB)n foam stabilizer for polyurethane foam is not recognized in the industry.

Patent Document 6 discloses a process for synthesizing an (AB)n copolymer under reduced pressure using isopropyl palmitate (IPP) as a reaction solvent and diluent. However, ester oils such as IPP and the like have a boiling point, and this is responsible for VOC/emission from the polyurethane foam obtained using a surfactant or a foam stabilizer obtained by such a process.

Similarly, Patent Document 7 discloses a technique for stably manufacturing an (AB)n copolymer with a particularly high molecular weight without causing increased viscosity, gelling, and the like, and there is no specific mention of an application in the field of polyurethane foam. In Example 1, a straight chain polyoxyethylene-dimethylpolysiloxane block copolymer is synthesized in fluid isoparaffin, and then low boiling components such as unreacted material are distilled off by stripping to obtain a fluid isoparaffin solution of the (AB)n copolymer. According to the quasi-drug component display name, fluid isoparaffin is made by hydrogenating a copolymer of isobutene and n-butene, and has a degree of polymerization of 5 to 10. Fluid isoparaffin is a mixture of high boiling point components, and therefore it is particularly difficult to remove components having a high degree of polymerization by stripping. Therefore, using fluid isoparaffin as a diluent for an (AB)n copolymer for polyurethane foam causes VOC/emission from the foam.

Patent Document 8 discloses a foam stabilizer for polyurethane foam containing an (AB)n copolymer and a specific monool organic compound such as dipropylene glycol monobutyl ether (BDPG). The specific monool organic compound can also be used as a synthesis reaction solvent and diluent for the (AB)n copolymer, and can be expected to reduce emissions from the foam because they are incorporated into the reaction system during polyurethane formation. However, there is a need for further improvements from the point of minimizing VOC/emission, since all of the monool organic compounds might not be consumed, depending on the foaming conditions.

Note that Patent Document 7 discloses a large number of reaction solvents that can be used as necessary in manufacturing the (AB)n copolymer, and also includes aliphatic hydrocarbons such as hexane, heptane, and the like, but the disclosure is simply non-limiting examples of a selectable solvent. In addition, many of these solvents are used in the manufacturing of (AB)n copolymers, but there are many solvents that are not practical because they inhibit reactions, cause reaction system non-uniformity and side-reactions, and the like, and a person of ordinary skill in the art would have to perform an enormous test in order to find an optimal solvent, and the reactivity and stability of the solvent would need to be verified, and there is no specific description whatsoever about selecting an appropriate solvent. In particular, there is no mention or suggestion whatsoever of the benefit of using (C) "a saturated hydrocarbon with an average number of carbon atoms of 6 to 11" as a (AB)n copolymer synthesis reaction solvent, which is a main component of a foam stabilizer for polyurethane foam, nor for obtaining an aromatic hydrocarbon-based solvent-free and low VOC/emission foam stabilizer for polyurethane foam by replacing the solvent with (poly)glycol or a polyglycol derivative. Therefore, Patent Document 7 does not clearly teach in a manner that can be understood by a person of ordinary skill in the art about a novel method of manufacturing a foam stabilizer for polyurethane foam containing (A) a straight chain polyether organopolysiloxane block copolymer and (B) (poly)glycol or a polyglycol derivative of the present invention, nor is there mention of the technical benefit thereof.

With respect to (A2), an example is elucidated in Examples 8, and 10 to 26 of Patent Document 9 in which the (AB)n copolymer is synthesized in an inert aromatic hydrocarbon-based solvent such as xylene, o-dichlorobenzene, an alkylated aromatic hydrocarbon mixture (Solvesso 100, Solvesso 150), and the like by a condensation reaction between an (S2) organopolysiloxane having a dimethylamino group at both terminals and (E1), a polyether having a hydroxyl group at both terminals (polyglycol). The boiling point range of these aromatic hydrocarbon-based solvents is 105 to 300° C. Examples 27 to 29 of the same document disclose an example where an (AB)n copolymer is synthesized in xylene by a condensation reaction between (S3) an organopolysiloxane having an ethoxy group at both terminals and (E1) a polyether having a hydroxyl group at both terminals. An aromatic hydrocarbon-based solvent solution of an (AB)n copolymer was tested as a surfactant for a mechanical floss polyurethane foam. Patent Document 10 is based on a finding that the manufacturing time for an (AB)n copolymer can be shortened by using carbon dioxide as a condensation reaction catalyst between (S2) an organopolysiloxane having a dimethylamino group at both terminals and (E1) a polyether having a hydroxyl group at both terminals, and xylene was used as a reaction solvent in the example. Patent Document 11 describes a technique of using a tertiary amine such as 1,8-diazabicyclo[5.4.0] undec-7-ene (DBU) as a condensation reaction catalyst between (S2) an organopolysiloxane having a dimethylamino group at both terminals and (E1) a polyether having a hydroxyl group at both terminals, and in the examples, a straight chain alkylbenzene having a boiling point range of 280 to 320° C. was used as a synthesis reaction solvent and diluent for the (AB)n copolymer. However, the above-mentioned high boiling point alkylbenzene has a problem of causing high VOC/emission and migration from the foam, and there is a problem in that an aromatic hydrocarbon-based solvent having a lower boiling point does not meet the requirements associated with a foam stabilizer that does not include BTX and the like.

Patent Document 12 reports an example of synthesizing an (AB)n copolymer using a condensation reaction of (S1) an organopolysiloxane having an SiH group on both terminals and (E1) a polyether having a hydroxyl group at both terminals in straight chain alkylbenzene having a boiling point range of 280 to 320° C. and using tris(pentaphenylfluoro)borane as a catalyst. Patent Document 13 reports an example of synthesizing (AB)n copolymer using a condensation reaction of (S1) an organopolysiloxane having an SiH group on both terminals and (E1) a polyether having a hydroxyl group at both terminals in straight chain alkylbenzene having a boiling point range of 280 to 320° C. and using 1,8-diazabicyclo[5.4.0] undec-7-ene (DBU) as a catalyst. It is difficult to remove high boiling point alkylbenzenes by stripping. The solution of the (AB)n copolymer thus obtained was tested as a foam stabilizer (foam stabilizer) for a typical flexible polyurethane foam. However, high boiling point alkylbenzene has the problems described above, and these techniques do not meet the needs of the current polyurethane industry that demands stringent VOC/emission control. These documents suggest using alkanes, cycloalkanes, and alkylated aromatic hydrocarbons as appropriate reaction solvents, and specifically suggest a high boiling point solvent with a boiling point exceeding 120° C. Therefore, a person of ordinary skill in the art would be not be incentivized to select (C) "a saturated hydrocarbon with an average number of carbon atoms of 6 to 11" as an (AB)n copolymer synthesis reaction solvent, nor to obtain an aromatic hydrocarbon-based solvent-free and low VOC/emission foam stabilizer for polyurethane foam by replacing the solvent with (poly)glycol or a polyglycol derivative. Furthermore, there is no mention nor suggestion whatsoever of the benefits of a method of manufacturing a novel foam stabilizer for polyurethane foam of the present invention.

In other words, the method of manufacturing an (AB)n polyether modified silicone or a foam stabilizer for polyurethane foam containing the same disclosed in Patent Documents 1 to 13 has the problem of not being able to meet the needs of the current polyurethane industry that requires strict VOC/emission control, or meet the requirements associated with a foam stabilizer that does not include BTX and the like. Thus, there is room for improvement. Therefore, these conventional (AB)n polyether modified silicone foam stabilizers are not sufficiently satisfactory in terms of their usefulness as foam stabilizers for polyurethane foams, and have a problem that widespread use is hindered from the perspective of having problems with performance and quality, or not meeting the needs of industrial regulations. Therefore, there is demand to develop a new manufacturing process and formulation for a foam stabilizer containing an (AB)n polyether modified silicone that can solve a plurality of problems, is easy to manufacture, can be supplied to the market in large quantities, and is sufficiently useful as a foam stabilizer for polyurethane foam.

RELATED ART DOCUMENTS

Patent Documents

Patent Document 1: U.S. Pat. No. 3,957,842 (Japanese Examined Patent Application No. S57-014797)
Patent Document 2: U.S. Pat. No. 4,150,048
Patent Document 3: Japanese Unexamined Patent Application No. H07-090102 (Patent No. 3319833)
Patent Document 4: U.S. Pat. No. 4,275,172 (Japanese Examined Patent Application No. S62-039605)
Patent Document 5: Japanese Unexamined Patent Application No. H08-156143
Patent Document 6: U.S. Pat. No. 5,869,727 (U.S. Pat. No. 4,319,711)
Patent Document 7: Japanese Unexamined Patent Application No. 2006-282820 A (Patent No. 4875314)
Patent Document 8: International Patent Application WO 2016/166979
Patent Document 9: U.S. Pat. No. 3,836,560 (Japanese Examined Patent Application No. S56-045440)
Patent Document 10: U.S. Pat. No. 3,792,073 (Japanese Examined Patent Application No. S53-012960)
Patent Document 11: U.S. Pat. No. 7,645,848
Patent Document 12: U.S. Pat. No. 7,825,205 (U.S. Pat. No. 5,422,115)
Patent Document 13: U.S. Pat. No. 7,825,209 (U.S. Pat. No. 5,231,796)
Patent Document 14: Japanese Unexamined Patent Application No. 2014-210832
Patent Document 15: U.S. Pat. No. 3,920,587
Patent Document 16: U.S. Pat. No. 8,791,168 (U.S. Pat. No. 5,371,760)

SUMMARY OF THE INVENTION

Problem to be Solved by the Invention

An object of the present invention is to solve the aforementioned problems, and to provide a new manufacturing method for a low VOC/emission foam stabilizer for polyurethane foam that contains (A) a straight chain polyether organopolysiloxane block copolymer and (B) (poly)glycol or a polyglycol derivative.

In addition, another object of the present invention aims to provide a polyether polysiloxane block copolymer composition that can avoid the use and incorporation of aromatic hydrocarbon-based solvents such as BTX (benzene, toluene, xylene) solvents and the like and that can be provided to the market in high quantities because manufacturing on an industrial production scale is simple, and by providing a method of manufacturing a foam stabilizer for polyurethane foam that uses this composition as a raw material, this high quality foam stabilizer can be sufficiently used in the market, thus contributing to the polyurethane industry as a high-performance ROM material, and promoting widespread activity.

Means for Solving the Problem

As a result of diligent research, the present inventors discovered that the above problems can be solved by a method of manufacturing a polyether polysiloxane block copolymer composition that includes a step of obtaining a polyether polysiloxane block copolymer (A) by a specific reaction in the presence of a saturated hydrocarbon solvent (C) having an average number of carbon atoms in a range of 6 to 11, and a step of replacing the solvent (C) used in the reaction with (B) (poly)glycol or a polyglycol derivative, either during or after the aforementioned step. Furthermore, the present invention was found to solve the problem described above by a method of manufacturing a foam stabilizer characterized by a composition obtained by this manufacturing method, and thus the present invention was achieved.

Effects of the Invention

The present invention provides a polyether polysiloxane block copolymer composition including (A) a straight chain polyether organopolysiloxane block copolymer and (B) (poly)glycol or a polyglycol derivative, as well as a new method of manufacturing a foam stabilizer for polyurethane foam, which is an application thereof. The polyether polysiloxane block copolymer composition obtained by the manufacturing method of the present invention has excellent transparency without using an aromatic hydrocarbon-based solvent such as BTX and the like, and is advantageous in production efficiency and manufacturing cost.

The present invention can manufacture a high quality foam stabilizer for polyurethane foam that is capable of meeting the needs of the current polyurethane industry that requires strict VOC/emission control and the elimination of BTX, and the like. Furthermore, the present invention can contribute to foam manufacturers being able to manufacture low VOC/emission PU foam.

Furthermore, the present invention can provide a method of manufacturing a foam stabilizer for polyurethane foam that is easy to manufacture on an industrial production scale and that can be supplied to the market in large quantities. Therefore, the present invention provides a wide variety of high quality foam stabilizers that are well-suited to the market and can be widely used as a raw material with high performance.

DESCRIPTION OF THE PREFERRED EMBODIMENT

Hereinafter, the polyether polysiloxane block copolymer composition containing (A) a polyether organopolysiloxane block copolymer and (B) (poly)glycol or a polyglycol derivative according to the present invention, a foam stabilizer using the composition as a raw material, particularly a foam stabilizer for polyurethane foam, and a method of manufacturing an aromatic hydrocarbon-based solvent-free and low VOC/emission foam stabilizer will be described in detail. First, each component will be described.

[Component (A)]

Component (A) is also referred to as an (AB)n polyether modified silicone, and may be (A1) a non-hydrolyzable copolymer in which the polysiloxane portion and the polyether portion are linked by a Si—C bond. Additionally, it may be (A2) a hydrolyzable copolymer in which the polysiloxane portion and polyether portion are linked by a Si—O—C bond.

Component (A1) is a straight chain polyether organopolysiloxane block copolymer having intramolecular component units expressed by the following general formula (1):

[Formula 1]

(where each R independently represents a monovalent hydrocarbon group having 1 to 9 carbon atoms without an aliphatic unsaturated bond, x is a number from 2 to 4, a is a number from 1 to 200, y is a number in the range from 400 to 5000, and represents the molecular weight of the polyether portion expressed by $(C_xH_{2x}O)_y$, n is a number that is at least 2, and Y represents a divalent hydrocarbon group having from 2 to 8 carbon atoms, which is bonded to an adjacent silicon atom by a carbon-silicon bond and to a polyoxyalkylene block by an oxygen atom), where the terminal group (—Z) in the molecule is one or more type of functional group selected from:

$Z^1$: alkenyl groups, hydroxyl groups, alkoxy groups, or acetoxy groups bonded to a polyether portion; and $Z^2$: monovalent hydrocarbon groups that do not have a heteroatom, hydroxyl groups, or alkoxy groups, bonded to a silicon atom.

Preferably, Y is a divalent hydrocarbon group having from 3 to 5 carbon atoms bonded to polyoxyalkylene block by an adjacent silicon atom and an oxygen atom by a carbon-silicon bond, where the polyether portion expressed by $(C_xH_{2x}O)_y$ is a copolymer including an oxyethylene portion, an oxypropylene portion, and/or an oxybutylene portion, and not only includes homopolymers expressed by $(C_2H_4O)_{y1}$, but also groups selected from $(C_2H_4O)_{y1}$, $(C_3H_6O)_{y2}$, $(C_2H_4O)_{y1}$, $(C_3H_6O)_{y2}$, $(C_4H_8O)_{y3}$, $(C_2H_4O)_{y1}$, and $(C_4H_8O)_{y3}$. Furthermore, the copolymer is preferably a random copolymer.

Component (A) according to the present invention preferably contains at least an oxypropylene unit or an oxybutylene unit in the polyether portion, particularly from the perspective of use as a foam stabilizer for polyurethane foam, and the number average molecular weight of the copolymer is preferably in a range from 30,000 to 150,000, and particularly preferably in a range of from 50,000 to 100,000.

More preferably component (A1) is a straight chain polyether organopolysiloxane block copolymer having intramolecular component units expressed by the general formula (2):

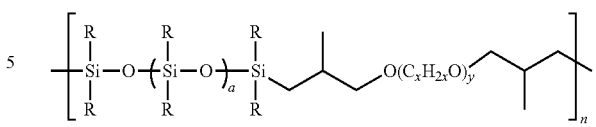

[Formula 2]

(where R independently represents a monovalent hydrocarbon group having from 1 to 9 carbon atoms without an aliphatic unsaturated bond, x is a number of 2 to 4, a is the number of polysiloxane portions expressed by $(R_2SiO)_a$ and having a molecular weight in a range from 400 to 2500, and y is the number of polyether portions expressed by $(C_xH_{2x}O)_y$, and having a molecular weight in a range from 2000 to 4500, the polyether portion is a random copolymer of an oxyethylene portion and an oxypropylene portion where the mass ratio of the oxyethylene ($C_2H_4O$) units of all of the polyether portions averages within a range of 30 to 80%, and n is a number that is at least 4), and a terminal group (—Z) thereof is at least one type of functional group selected from:

$Z^1$: alkenyl groups, hydroxyl groups, alkoxy groups, or acetoxy groups bonded to a polyether portion; and $Z^2$: monovalent hydrocarbon groups that do not have a heteroatom, hydroxyl groups, or alkoxy groups, bonded to a silicon atom.

In the aforementioned General Formula (1) and (2), R independently represents a monovalent hydrocarbon group with 1 to 9 carbon atoms that do not have an aliphatic unsaturated bond, and examples include alkyl groups with 1 to 9 carbon atoms and phenyl groups. A methyl group, ethyl group, or phenyl group is preferable. Industrially, methyl groups particularly preferable.

Component (A1) is a straight chain polyether organopolysiloxane block copolymer having the aforementioned specific structural unit, where a terminal group (—Z) thereof is one or more type of functional group selected from the aforementioned $Z^1$ and $Z^2$. Herein, from the perspective of use as a foam stabilizer and stability of the copolymer, both terminals of the copolymer are preferably blocked by a functional group including a polyether portion, and in this case, the terminal group (—Z) is preferably an alkenyl group, hydroxyl group, alkoxy group, or acetoxy group bonded to a polyether portion, and is particularly preferably a methallyl group.

On the other hand, from the perspective of use as a foam stabilizer, stability of the copolymer, and safety, the terminal group (—Z) must not include a reactive functional group having a hetero atom, and particularly must not include a ring-opening reactive functional group which is an epoxy group, or an amine group or the like. Note that when the straight chain polyether organopolysiloxane block copolymer is synthesized, if the organopolysiloxane having an SiH group on both terminals is used in the raw material, a portion of the terminal SiH may react with an alcohol that is present in the reaction system as a catalytic solvent, and thus a portion of the terminal groups (—Z) of a portion of component (A) of the present invention may be a residual group of an alcohol.

Component (A2) is preferably a straight chain polyether organopolysiloxane block copolymer having intramolecular structural units expressed by the following general Formula (1'):

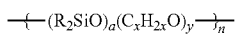
[Formula 3]

(where R independently represents a monovalent hydrocarbon group with 1 to 9 carbon atoms, which does not have an aliphatic unsaturated bond; x represents a number from 2 to 4; a represents a number from 7 to 200; y represents a number where the molecular weight of a polyether portion as expressed by $(C_xH_{2x}O)_y$ is within a range of 400 to 5000; and n represents a number that is at least 2), where the terminal group (—Z) is one or more type of functional group selected from:

$Z^1$: a hydroxyl group, alkoxy group, or acetoxy group bonded to a polyether portion; and $Z^2$: a hydroxyl group, alkoxy group, dimethylamino group, hydrogen, halogen, carbamate group, or other leaving group bonded to a silicon atom.

Preferably, the polyether portion expressed by $(C_xH_{2x}O)_y$ in the above general formula (3) is a copolymer of an oxyethylene portion, oxypropylene portion, and/or oxybutylene portion that includes not only homopolymers of $(C_2H_4O)_{y1}$, but also groups selected from $(C_2H_4O)_{y1}$, $(C_3H_6O)_{y2}$, $(C_2H_4O)_{y1}$, $(C_3H_6O)_{y2}$, $(C_4H_8O)_{y3}$, $(C_2H_4O)_{y1}$, and $(C_4H_8O)_{y3}$. Furthermore, the copolymer is preferably a random copolymer.

More preferably, in the aforementioned general formula (3), a is the number of polysiloxane portions expressed by $(R2SiO)_a$ and having a molecular weight in a range from 600 to 2500, and y is the number of polyether portions expressed by $(C_xH_{2x}O)_y$ and having a molecular weight in a range from 2000 to 4500, the polyether portion is a random copolymer of an oxyethylene portion and an oxypropylene portion where the mass ratio of the oxyethylene $(C_2H_4O)$ units of all of the polyether portions averages within a range of 30 to 80%, and n is a number that is at least 4.

Component (A2) is a straight chain polyether organopolysiloxane block copolymer having the aforementioned specific structural unit, where a terminal group (—Z) thereof is one or more type of functional group selected from the aforementioned $Z^1$ and $Z^2$. Herein, from the perspective of use as a foam stabilizer and stability of the copolymer, both terminals of the copolymer are preferably blocked by a functional group including a polyether portion, and in this case, the terminal group (—Z) is preferably a hydroxyl group, alkoxy group, or acetoxy group bonded to a polyether portion.

In the aforementioned General Formula (3), R independently represents a monovalent hydrocarbon group with 1 to 9 carbon atoms that do not have an aliphatic unsaturated bond, and examples include alkyl groups with 1 to 9 carbon atoms and phenyl groups. A methyl group, ethyl group, or phenyl group is preferable. Industrially, methyl groups particularly preferable.

Herein, the non-hydrolyzable (AB)n polyether modified silicone (A1) can be synthesized by a hydrosilylation reaction between a polyether raw material having a carbon-carbon double bond and having an allyl group or a methallyl group at both terminals of the molecular chain and an organopolysiloxane having an SiH group on both terminals, in the presence of a solvent (C), "a saturated hydrocarbon with an average number of carbon atoms of 6 to 11" according to the present invention. As described above, both terminals thereof are preferably blocked with a functional group including a polyether portion, and are particularly preferably synthesized by adding an amount of vinyl groups in the polyether raw material that is an equal or slightly excess amount with regard to the silicon-bonded hydrogen atoms in the organopolysiloxane having an SiH group on both terminals, causing a hydrosilylation reaction.

The non-hydrolyzable copolymer (A1) which is the straight chain polyether organopolysiloxane block copolymer of component (A) according to the present invention can be obtained by a hydrosilylation reaction between an organopolysiloxane (S1) having an SiH group on both terminals as expressed by the following General Formula (4)

General Formula (4):

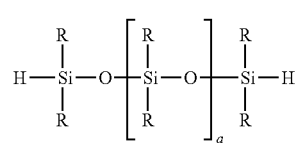
[Formula 4]

(where a is a number from 1 to 200 and R is the same as above) and a polyether (E4) having an alkenyl group on both terminals as expressed by the following General Formula (5)

General Formula (5):

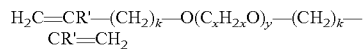
[Formula 5]

(where x and y are the same number, k is a number from 0 to 6, each R' is independently hydrogen or a monovalent alkyl group having from 1 to 6 carbon atoms) a hydrogen, or a monovalent hydrocarbon.

When the polyether organopolysiloxane block copolymer (A) is used as the main component of the foam stabilizer for polyurethane foam, the hydrosilylation reaction must be carried out in the presence of an appropriate reaction solvent, and in the present invention, it is necessary to carry out the hydrosilylation reaction, with (C) "a saturated hydrocarbon with an average number of carbon atoms of 6 to 11" used as the reaction solvent for manufacturing component (A).

Suitable examples of the polyether (E4) having an alkenyl group on both terminals include polyether (E2) having an allyl group on both terminals expressed by the following general formula (6), or the polyether (E3) having a methallyl group on both terminals expressed by the following general formula (7).

General Formula (6):

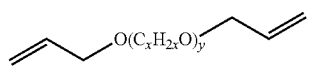
[Formula 6]

(where x and y represent the same numbers as described above).

General Formula (7):

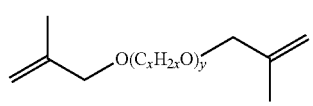
[Formula 7]

(where x and y represent the same numbers as described above).

These polyethers having an alkenyl group on both terminals may contain a small amount of impurities such that one terminal group is a hydroxyl group due to the manufacturing conditions or the like.

Herein, the hydrolyzable (AB)n polyether modified silicone (A2) can be obtained by condensation reacting an organopolysiloxane (SX) having an SiX group on both terminals as expressed by the following general formula (8) General Formula (8):

[Formula 8]

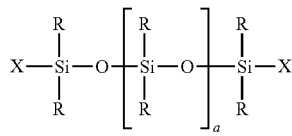

(where a is a number from 7 to 200, R is the same as above, and X is a reactive group selected from hydroxyl groups, alkoxy groups, dimethylamino groups, hydrogen, halogens, carbamate groups, or another leaving group.) and a polyether (E1) having a hydroxyl group on both terminals as expressed by the following General Formula (9)

General Formula (9):

$$HO-(C_xH_{2x}O)_y-H$$ [Formula 9]

When the straight chain polyether organopolysiloxane block copolymer (A) is used as the main component of the foam stabilizer for polyurethane foam, the condensation reaction must be carried out in the presence of an appropriate reaction solvent, and in the present invention, it is necessary to carry out the hydrosilylation reaction with (C) "a saturated hydrocarbon with an average number of carbon atoms of 6 to 11" used as the reaction solvent for manufacturing the foam stabilizer.

Suitable organopolysiloxanes (SX) having an SiX group on both terminals are an organopolysiloxane (S2) having a dimethyl amino group on both terminals expressed by the following general formula (10), an organopolysiloxane (S4) having a carbamate group on both terminals expressed by the following general formula (11), and the organopolysiloxane (S3) having an alkoxy group on both terminals expressed by General Formula (12).
General Formula (10):

[Formula 10]

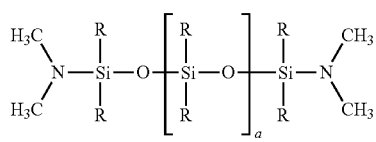

(where a is a number from 7 to 200, and R is the same as the above) General Formula (11):

[Formula 11]

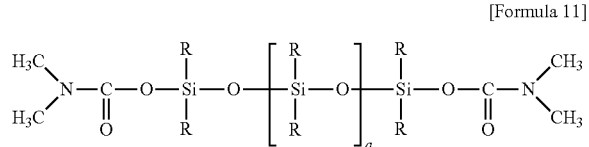

(where a is a number from 7 to 200, and R is the same as the above) General Formula (12):

[Formula 12]

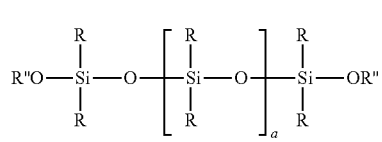

(where a is a number from 7 to 200, R is the same as described above, and R" is a hydrocarbon group having 8 or fewer carbon atoms, preferably 4 or fewer carbon atoms)

[Component (B)]

Component (B) is (poly)glycol or a polyglycol derivative. Component (B) is a solvent of the straight chain polyether organopolysiloxane block copolymer (A), and is introduced into the system after performing the synthesis reaction of component (A) in the presence of "a saturated hydrocarbon with an average number of carbon atoms of 6 to 11" or during the synthesis reaction. Furthermore, by substituting the reaction solvent (C) "a saturated hydrocarbon with an average number of carbon atoms of 6 to 11" with component (B), a polyether polysiloxane block copolymer composition that contains both (A) and (B) is manufactured. By using the composition as a raw material, it is possible to manufacture an aromatic hydrocarbon-based solvent-free and low VOC/emission foam stabilizer for polyurethane foam, a polyurethane foam-forming composition, and a polyurethane foam.

Component (B) must be a liquid having affinity with component (A), and preferably the flow point is 0° C. or lower. Examples of (B) include propylene glycol, butylene glycol, dipropylene glycol, tripropylene glycol, polypropylene glycol, polybutylene glycol, polypropylene glycol/polyethylene glycol copolymer, polypropylene glycol monobutyl ether, polypropylene glycol/polyethylene glycol monobutyl ether, polypropylene glycol monomethyl ether, polypropylene glycol/polyethylene glycol monomethyl ether and the like. Component (B) can be selected according to the required characteristics of the polyurethane foam to be manufactured using the polyether polysiloxane block copolymer composition or the foam stabilizer according to the present invention. For example, if a high air permeability foam is required, it is advantageous to use a monool compound such as polypropylene glycol monobutyl ether as component (B), and if a low air permeability foam is required, it is advantageous to use a diol compound such as polypropylene glycol as component (B). When the air permeability is to be balanced, the monool compound and the diol compound can be used in combination as component (B).

Component (B) is a component that functions as a solvent for component (A), and in the method of manufacturing a polyether polysiloxane block copolymer composition according to the present invention, it is important that these components are used at a mass ratio of (A)/(B) in a range of 10/90 to 60/40 from the perspective of performance, convenience during use, handling workability, and compatibility with polyurethane foam formulations, and the like, but the mass ratio of (A)/(B) is preferably in a range of 20/80 to 50/50.

It is important that the polyether polysiloxane block copolymer composition according to the present invention containing the aforementioned component (A) and component (B) has a viscosity at 25° C. that is within a range of 1,000 to approximately 60,000 mm2/s from the perspective of convenience during use, handling, and the like. Preferably, the viscosity of the foam stabilizer is in a range of 1000 to approximately 30,000 mm2/s, more preferably in a range of 1000 to approximately 10,000 mm2/s.

Manufacture of Aromatic Hydrocarbon-Based Solvent-Free Composition

In the manufacturing method of the present invention, the component (A) is synthesized in the presence of a saturated hydrocarbon solvent with an average number of carbon atoms of 6 to 11, which is the aforementioned component (C), and component (C) which is the reaction solvent is replaced by component (B), either after the reaction step or during the reaction step. Therefore, the polyether polysiloxane block copolymer composition obtained by the manufacturing method of the present invention does not substantially contain an aromatic hydrocarbon-based solvent such as a BTX (benzene, toluene, xylene) solvent. In particular, in the manufacturing method of the present invention, an aromatic hydrocarbon-based solvent is preferably not used at all, and ultimately, the aromatic hydrocarbon solvent in the polyether polysiloxane block copolymer composition obtained is preferably 1000 ppm (by weight) or less, and particularly preferably 100 ppm (by weight) or less, and most preferably 10 ppm (by weight) or less. With the manufacturing method of the present invention, a low VOC/emission foam stabilizer for polyurethane foam with industrially sufficient production efficiency and that does not use an aromatic hydrocarbon-based solvent such as a BTX (benzene, toluene, xylene) solvent can be provided by a polyether polysiloxane block copolymer composition suitable as a foam stabilizer.

Note that if the polyether polysiloxane block copolymer composition according to the present invention is used as a foam stabilizer for an aromatic hydrocarbon-based solvent-free and low VOC/emission foam stabilizer for polyurethane foam, the composition can be used in combination with or mixed with another silicone-based foam stabilizer for a polyurethane foam, depending on the type of foam, so long as the technical features are not impaired. In this case, the amount of the second silicone-based foam stabilizer is preferably a range that does not exceed the mass of component (A) in the entire composition. Further, it is desirable that the second silicone-based foam stabilizer is also free of aromatic hydrocarbon-based solvent and is a low VOC/emission type.

The polyether polysiloxane block copolymer composition according to the present invention containing component (A) and component (B) is gradually oxidized by oxygen in the air and deteriorates. In order to prevent this, phenols, hydroquinones, benzoquinones, aromatic amines, vitamins, or other antioxidants can be and is preferably inserted to increase the oxidation stability. From the viewpoint of achieving low VOC/emissions, it is preferable to use a non-volatile antioxidant such as vitamin E or the like. In this case, the mass of the added amount of antioxidant is within a range of 10 to 1000 ppm, and preferably 50 to 500 ppm, with regard to Component (A), and within a range of 10 to 10000 ppm, and preferably 100 to 5000 ppm with regard to Component (B).

[Reduction of Low Molecular Siloxane]

When the polyether polysiloxane block copolymer composition according to the present invention is used as an aromatic hydrocarbon-based solvent-free and low VOC/emission foam stabilizer for polyurethane foam, it is preferable that the composition contains substantially no low molecular weight siloxanes with 20 or fewer silicon atoms. Specifically, the polyether polysiloxane block copolymer composition obtained by the manufacturing method of the present invention preferably has 5000 ppm (by weight) or less, and particularly preferably 2000 ppm (by weight) or less of low molecular weight siloxane with 20 or fewer silicon atoms. If the value exceeds 5000 ppm, use of the polyether polysiloxane block copolymer composition of the present invention as a foam stabilizer of polyurethane foam or the like may contaminate members in proximity to where the polyurethane foam is installed, and may cause contact failure of electrical and electronic devices. The low molecular weight siloxanes include cyclic and straight chain siloxanes, and for example, includes cyclic dimethylsiloxane expressed by the formula $[(CH_3)_2SiO]_{n'}$ (where n' is an integer from 3 to 10). and straight chain dimethylsiloxane oligomers expressed by the formula, $CH_3[(CH_3)_2SiO]_mSi(CH_3)_3$ (where m is an integer from 1 to 10) and a portion of these methyl groups may be substituted with other organic groups. Specific examples of the low molecular siloxane include octamethyl tetrasiloxanes, decamethyl pentacyclosiloxanes, and dimethyl siloxane oligomers blocked by a trimethyl siloxane group on both terminals. The amount of the low molecular weight siloxane can be measured by introducing, for example, a volatile component generated by heating the foam stabilizer according to the present invention into a gas chromatography analyzer and analyzing.

Reduction of the low molecular siloxane is achieved, for example, by removing the low molecular weight siloxane by applying the method described in JP 2000-313730A or the like to the foam stabilizer according to the present invention. There are many methods for removing the low molecular siloxane. Examples include: a method of performing treatment under high temperature and high vacuum while an inert gas such as argon gas, nitrogen gas, or the like is blown into a silicone-based foam stabilizer a small amount at a time; a method of thinning the foam stabilizer according to the present invention and then stripping under a heating condition of 50 to 130° C. under a reduced pressure of 0.5 mm or less; and a method of adding to the silicone-based foam stabilizer an organic solvent that dissolves the low molecular weight siloxane but does not dissolve high molecular siloxane, and then extracting to remove the low molecular weight siloxane. Herein, if thermal decomposition is a concern during treatment at a high temperature, an antioxidant can be added in advance.

Manufacturing Method According to the Present Invention

The method of manufacturing a polyether polysiloxane block copolymer composition of the present invention includes: a step of synthesizing a polyether polysiloxane block copolymer by a condensation reaction or hydrosilylation reaction in the presence of a saturated hydrocarbon solvent (C) having an average number of carbon atoms in a range of 6 to 11, and a step of replacing the reaction solvent (C) with (poly)glycol or a polyglycol derivative (B), either during or after the aforementioned step.

Hereinafter, the reaction solvent (C) that characterizes the present invention will be described, and then the details will be described separately for the method of manufacturing the copolymer (A1) via the hydrosilylation reaction and the copolymer (A2) via a condensation reaction.

Hydrocarbon Solvent (C)

In the method of manufacturing a polyether polysiloxane block copolymer composition according to the present invention, (I) a step of synthesizing a copolymer (A) by a condensation reaction or a hydrosilylation reaction using a saturated hydrocarbon with an average number of carbon atoms of 6 to 11. Unlike other highly polar organic solvents, such a saturated hydrocarbon solvent does not make the appearance of the copolymer (A) or the foam stabilizer opaque or non-homogeneous, and excess foam will not be stabilized in a subsequent solvent replacement step (Step (II), and therefore an aromatic hydrocarbon-based solvent-free and low VOC/emission polyether polysiloxane block copolymer composition as well as a foam stabilizer for polyurethane foam, which is an application thereof, can be manufactured. Furthermore, these solvents are components that do not correspond to the above-mentioned aromatic hydrocarbon-based solvents and low molecular weight siloxanes, and even if the amount of these solvents is substantially 0, the polyether polysiloxane block copolymer composition can be favorably manufactured.

Specific examples of the reaction solvent (C) include methylcyclohexane, n-heptane, heptane mixture, heptane (commercial grade), isooctane, 2,2,4-trimethylpentane, octane mixture, ethyl cyclohexane, dimethylcyclohexane, n-hexane, isohexane, hexane mixture, cyclohexane, 2-methylpentane, 2-methylheptane, 3-methylheptane, Isopar E (C7-C9 saturated hydrocarbon mixture), Isopar C (C7-C8 saturated hydrocarbon mixture), IP solvent 1016 (C6-C9 saturated hydrocarbon mixture), Isopar G (C10-C11 saturated hydrocarbon mixture), and the like. Among these, methylcyclohexane or n-heptane is preferred. Furthermore, these solvents of "saturated hydrocarbon with an average number of carbon atoms of 6 to 11" may be used alone, or in combination of two or more. In particular, only saturated hydrocarbons having an average carbon atom number in a range of 6 to 9 are preferably used, and the use of a saturated hydrocarbon solvent substantially free of saturated hydrocarbons with an average number of carbon atoms exceeding 12 is especially preferable, in terms of industrial productivity.

Method of Manufacturing (A1)

The non-hydrolyzable straight chain polyether organopolysiloxane block copolymer composition (A1) according to the present invention is preferably obtained by a hydrosilylation reaction between an organopolysiloxane having an SiH group on both terminals as expressed by the General Formula (4), and a polyether having an allyl group or methallyl group on both terminals of a molecular chain, as expressed by General Formula (6) or (7). At this time, the step of initiating or advancing the hydrosilylation reaction is performed in the presence of (C) "a saturated hydrocarbon with an average number of carbon atoms of 6 to 11" as a reaction solvent.

A hydrosilylation reaction catalyst is not limited to a specific catalyst, so long as a hydrosilylation reaction can be promoted. Many metals and compounds are currently known as hydrosilylation reaction catalysts, which can be appropriately selected and used in the present invention. Specific examples of the hydrosilylation reaction catalyst can include fine particulate platinum adsorbed on silica fine powder or a carbon powder carrier, chloroplatinic acids, alcohol-modified chloroplatinic acids, olefin complexes of a chloroplatinic acid, coordinate compounds of a chloroplatinic acid and vinyl siloxane, platinum black, palladium, and rhodium catalysts. The manufacturing method of the present invention preferably uses a solution of chloroplatinic acid, a solution of alcohol modified chloroplatinic acid, a solution of platinum-2,4,6,8-tetramethyl-2,4,6,8-tetravinyltetrasiloxane complex, or a tetramethyldisiloxane solution of a 1,3-divinyl-1,1,3,3-tetramethyldisiloxane platinum complex.

The amount of the hydrosilylation reaction catalyst used is an effective amount, and the amount is not particularly limited so long as the amount promotes a formation reaction of the polyether polysiloxane block copolymer composition (A1) according to the present invention. Specifically, the metal atoms in the catalyst are in an amount within a range of 0.1 to 1,000 ppm by mass units, and platinum metal atoms are preferably within a range of 0.5 to 200 ppm, with regard to the total amount (entire amount set as 100 mass %) of the organopolysiloxane having an SiH group on both terminals as expressed by General Formula (4) and polyether having an allyl group or methallyl group on both terminals in a molecular chain as expressed by General Formula (6) or (7). This is because when the amount of hydrosilylation reaction catalysts is less than the lower limit of the aforementioned range, a copolymerization reaction may be insufficient, and when the amount exceeds the upper limit of the aforementioned range, coloring or the like and transparency of the obtained present invention composition may be adversely affect in addition to being uneconomical.

Furthermore, to the extent that the technical effect of component (A1) according to the present invention is not lost, a carboxylic acid alkali metal salt such as potassium acetate, potassium propanoate, or the like is added in the reaction system for the purpose of suppressing side-reactions, so that the main hydrosilylation reaction can proceed.

As described above, from the perspective of use as a foam stabilizer and stability of the copolymer, component (A1) according to the present invention is preferably a straight chain polyether organopolysiloxane block copolymer where both terminals are blocked by a functional group including a polyether portion, and a polyether raw material having a C=C group or the like on both terminals is preferably added to an organopolysiloxane having an SiH group on both terminals such that the substance amount of methallyl groups in the polyether raw material is an equal or slightly excess amount with regard to the silicon-bonded hydrogen atoms in the organopolysiloxane containing a SiH group on both terminals, and then a hydrosilylation reaction is performed. Specifically, the reaction is preferably performed until the material ratio (molar ratio) of C=C groups (RVi) in the polyether raw material and silicon-bonded hydrogen atoms (Si—H) in the organopolysiloxane having an SiH group on both terminals is [RVi]/[Si—H]=1.0 to 1.50, and preferably 1.0 to 1.20.

The conditions for the hydrosilylation reaction require (C) "saturated hydrocarbon with an average number of carbon atoms of 6 to 11" as the reaction solvent. The component (A1) according to the present invention can be obtained by adding a small amount of an antioxidant such as tocopherol (vitamin E) and heating and stirring at a temperature of room temperature to 140° C. (below the boiling point of the reaction solvent), preferably 70 to 120° C., in an inert gas atmosphere such as nitrogen or the like. Note that the antioxidant may be added after hydrosilylation is completed. The reaction time can be selected based on the reaction scale, amount of catalyst used, and reaction temperature, and is generally within a range of several minutes to several hours. Further, the reaction may be carried out under reduced pressure, and for example, the conditions proposed in Patent Document 6 or the like can be applied without particular limitation.

Note that the end point of the hydrosilylation reaction can be confirmed by the disappearance of Si—H bond absorption by infrared spectroscopy (IR), or the absence of hydrogen gas generation by an alkali decomposition gas. The silicon-bonded hydrogen atoms (Si—H) in the organopolysiloxane having an SiH group on both terminals which is a reaction raw material can be analyzed by the same method, and therefore, the amount of hydrogen gas generation can be specified.

Alkali Decomposition Gas Generation Method: Method of reacting at room temperature a 28.5 mass % caustic potash ethanol/water mixed solution with a solution where a sample is dissolved in toluene or IPA, collecting the generated hydrogen gas in a collection tube, and then measuring the volume thereof Solvent Exchange Reaction Solvent (C)→Component (B)

The polyether polysiloxane block copolymer composition according to the present invention and the aromatic hydrocarbon-based solvent-free and low VOC/emission foam stabilizer for polyurethane foam that uses the composition can be manufactured by the synthesis reaction of component (A1), and alternatively, after the reaction is completed, the reaction solvent (C) can be manufactured by exchanging the solvent with the diluent component (B). Component (A1) is usually a high molecular weight and high viscosity fluid, and preferably can be manufactured by a method of removing approximately 50/100 to 99/100 of the reaction solvent (C) by stripping after the synthesis reaction of component (A1) is completed, then adding an equivalent amount of component (B): (poly)glycol or a polyglycol derivative, completely removing the remaining reaction solvent (C) by stripping, and then adding and mixing the remaining portion of (B), or the like. Component (B) can be selected according to the required characteristics of the polyurethane foam manufactured by using the polyether polysiloxane block copolymer composition or the foam stabilizer according to the present invention. Therefore, the monool/diol can be used alone or in combination, and polypropylene glycol of different types and molecular weights can be used in combination of a plurality. In the solvent exchange step, foam generated during stirring tends to be stabilized, and therefore, in the industrial production process, the degree of decompression during stripping, the heating temperature, and the stirring speed are preferably appropriately controlled. Increase in manufacturing time due to foam generation during stripping is suppressed, and therefore, a reaction can be initiated from a condition where the pressure is reduced in advance to a certain degree. Ultimately, the reaction solvent (C) in the final composition of polyether polysiloxane block copolymer composition is preferably 5000 ppm (by weight) or less, and particularly preferably 1000 ppm (by weight) or less, and most preferably 100 ppm (by weight) or less.

Optional Purification/Low Bromination Treatment

Furthermore, if purification or low bromination of a crude product is required based on the application of the polyether polysiloxane block copolymer composition according to the present invention, or a foam stabilizer that uses this composition, a conventionally known purification method such as hydrogenation, contact with an acidic substance, removal of generated aldehydes, or the like may be added. These methods can be selected without particular limitation from purification method 1 and purification method 2 proposed in paragraph 0031 of JP2007-186557A and the like, a method for reducing odor proposed in JP2000-327785 and the like, a treatment method using an acidic inorganic salt proposed in JP2011-116902 by the present applicant, and the like. In particular, by using the purification methods, the amount of harmful aldehydes generated over time is very low, even if the composition is added to polyurethane foam, and thus the composition has advantages for being useful as a foam stabilizer of polyurethane foam applied in building materials, the automotive industry (such as automotive interior material), beds, sofas, and other furniture, bedding, clothing, and the like.

Method of Manufacturing (A2)

The hydrolyzable straight chain polyether organopolysiloxane block copolymer composition (A2) according to the present invention is preferably obtained by a condensation reaction between an organopolysiloxane (SX) having an SiX group on both terminals as expressed by the General Formula (8), and a polyether (E1) having a hydroxyl group on both terminals, as expressed by General Formula (9). At this time, the step of initiating or advancing the condensation reaction is performed in the presence of (C) "a saturated hydrocarbon with an average number of carbon atoms of 6 to 11" as a reaction solvent.

The reaction may optionally be performed under reduced pressure and/or in the presence of a catalytic amount (for example, o, oi or double placement of the total amount of reactants) of a catalyst, for example, a carboxylic acid such as trifluorolacetic acid, perfluorolbutyric acid, monochloroacetic acid, and the like, or a mixture thereof. When an acid catalyst is used in the condensation reaction, it is necessary to remove or neutralize the acid in order to obtain a stable block copolymer (AB)n. However, this reaction proceeds fairly quickly without the addition of such a catalyst. The condensation reaction may optionally be performed under reduced pressure and/or in the presence of a catalytic amount (for example, 0.01 to 2 weight parts based on the total amount of reactants) of a catalyst, for example, a carboxylic acid such as trifluorolacetic acid, perfluorolbutyric acid, monochloroacetic acid, and the like, or a mixture thereof. When an acid catalyst is used in the condensation reaction, it is necessary to remove or neutralize the acid in order to obtain a stable block copolymer (A2). Therefore, in addition to the above acids, a buffer component such as a methanol solution of sodium acetate can be added to proceed with the reaction. (Example where the leaving group X=OR") However, depending on the type of the leaving group X, the condensation reaction proceeds fairly rapidly without the addition of such a catalyst (for example, $X=NMe_2$, $OCONMe)_2$). In the case where X=Cl, an acid acceptor such as a tertiary amine is preferably added to trap the hydrochloride freed by condensation or used as a catalyst. In the case of X=H, hydrogen gas is generated by condensation, but the catalyst can be an organometallic compound containing tin or platinum, a tertiary amine compound such as DBU, and the like. See Patent Documents 9 to 13 for details of a suitable catalyst or for the amount to be added for condensation reactions.

As described above, from the perspective of use as a foam stabilizer and stability of the copolymer, component (A2) according to the present invention is preferably a straight chain polyether organopolysiloxane block copolymer where both terminals are blocked by a functional group including a polyether portion, and a polyether raw material having a OH group or the like on both terminals is preferably added to an organopolysiloxane having an SiX group on both terminals such that the substance amount of hydroxyl groups in the polyether raw material is an equal or slightly excess amount with regard to the silicon-bonded X groups in the organopolysiloxane containing a SiX group on both terminals, and then a condensation reaction is performed. Specifically, the reaction is preferably performed until the material ratio (molar ratio) of OH groups in the polyether raw material and silicon-bonded X groups (Si—X) in the organopolysiloxane having an SiX group on both terminals is [OH]/[Si—X]=1.0 to 1.50, and preferably 1.0 to 1.20.

The conditions for the condensation reaction require (C) "saturated hydrocarbon with an average number of carbon atoms of 6 to 11" as the reaction solvent. The component (A1) according to the present invention can be obtained by adding a small amount of an antioxidant such as tocopherol (vitamin E) and heating and stirring at a temperature of 50 to 140° C. (below the boiling point of the reaction solvent), preferably 70 to 120° C., in an inert gas atmosphere such as nitrogen or the like. Note that the antioxidant may be added after hydrosilylation is completed. The reaction time can be selected based on the reaction scale, amount of catalyst used, and reaction temperature, and is generally within a range of several hours to about a half day. Furthermore, the reaction may be carried out under reduced pressure depending on the type of leaving group. Refer to Patent Documents 9 to 13 for details on the reaction conditions.

Note that the end point of the condensation reaction should be confirmed by an optical separation analysis method such as $^{29}$SiNMR or IR or the like, depending on the type of leaving group X of the raw material (SX) organopolysiloxane having an SiX group at both terminals to be used, or by determining whether or not the target value has been reached by measuring the viscosity of the reaction solution, GPC measurement, or the like.

Solvent Exchange Reaction Solvent (C)→Component (B)

The foam stabilizer for an aromatic hydrocarbon-based solvent-free and low VOC/emission foam stabilizer for polyurethane foam according to the present invention can be manufactured by the synthesis reaction of component (A2), and alternatively, after the reaction is completed, the reaction solvent (C) can be manufactured by exchanging the solvent with the diluent component (B). Component (A2) is usually a high molecular weight and high viscosity fluid, and preferably can be manufactured by a method of removing approximately $^{50}/_{100}$ to $^{99}/_{100}$ of the reaction solvent (C) by stripping after the synthesis reaction of component (A2) is completed, then adding an equivalent amount of component (B): (poly)glycol or a polyglycol derivative, completely removing the remaining reaction solvent (C) by stripping, and then adding and mixing the remaining portion of (B), or the like. Component (B) can be selected according to the required characteristics of the polyurethane foam manufactured by using the polyether polysiloxane block copolymer composition or the foam stabilizer according to the present invention. Therefore, the monool/diol can be used alone or in combination, and polypropylene glycol of different types and molecular weights can be used in combination of a plurality. Note that in the solvent exchange step, foam generated during stirring tends to be stabilized, and therefore, in the industrial production process, the degree of decompression during stripping, the heating temperature, and the stirring speed are preferably appropriately controlled. Increase in manufacturing time due to foam generation during stripping is suppressed, and therefore, a reaction can be initiated from a condition where the pressure is reduced in advance to a certain degree. Ultimately, the reaction solvent (C) in the final composition of polyether polysiloxane block copolymer composition is preferably 5000 ppm (by weight) or less, and particularly preferably 1000 ppm (by weight) or less, and most preferably 100 ppm (by weight) or less.

Use of Foam Stabilizer Obtained by the Manufacturing Method of the Present Invention An aromatic hydrocarbon-based solvent-free and low VOC/emission foam stabilizer for polyurethane foam, which includes the (A) straight chain polyether organopolysiloxane block copolymer and (B) (poly)glycol or a polyglycol derivative obtained by the manufacturing method of the present invention, is a solution of a so-called (AB)n polyether modified silicone in (poly)glycol or polyglycol derivative, and can be used without particular limitation to applications for (AB)n polyether modified silicone foam stabilizers for polyurethane foam obtained by known manufacturing methods.

In addition, the "aromatic hydrocarbon-based solvent-free and low VOC/emission foam stabilizer for polyurethane foam" obtained by the manufacturing method of the present invention is easy to manufacture on an industrial production scale and can be provided to the market in large quantities, and furthermore, it can meet the needs of the current polyurethane industry, which requires strict VOC/emission management and non-use of BTX. Furthermore, the present invention can contribute to foam manufacturers being able to manufacture low VOC/emission PU foam. Therefore, the present invention provides a wide variety of high quality foam stabilizers that are well-suited to the market and can be widely used as a raw material with high performance.

Polyurethane Foam-Forming Composition

The foam stabilizer is used in manufacturing polyurethane foam. Specifically, the foam stabilizer is used as a raw material for a polyurethane foam-forming composition to be added to the composition to form a good foam, or can be used as a premix by mixing with another raw material (including a catalyst) of the composition. The premix can be stored, and is mixed with the remaining reactive raw material immediately prior to foaming when forming the polyurethane foam. The foam stabilizer is not particularly limited by the type and properties of the polyurethane foam and the type of formulation used, but is preferably used for manufacturing low VOC/emission PU foam as described above.

Type of Foam

In general, polyurethane foam includes hard polyurethane foam and flexible polyurethane foam, which are specifically classified into soft urethane foam, high resilience urethane foam, hard urethane foam, special foam, and the like, based on the hardness, physical properties, density, or the like of the foam. The foam stabilizer for polyurethane foam including the (AB)n polyether modified silicone obtained by the manufacturing method of the present invention does not use a high boiling point solvent, which is the primary cause of VOC/emission, and does not use an aromatic hydrocarbon-based solvent, so elimination of a BTX solvent is easy. Therefore, the foam stabilizer facilitates manufacture of BTX-free foams, premix systems, and the like by foam manufacturers and foam formulation (system) designers. Furthermore, it is also possible to provide a urethane foam with low VOC/emissions. In addition, various polyurethane foam formulations can exhibit superior effects as foam stabilizers.

Soft urethane foam is widely used as a cushion material for sofas or beds and sheets for automobiles and the like. The viscosity of a soft slab foam raw material system is relatively low and has a high foam expansion ratio, and therefore, stabilization of a cell membrane during cell growth is a major key. A foam stabilizer with a relatively high molecular weight (polyether-modified silicone) is well suited for this system. Furthermore, compatibility with 3000 #polyol is ensured, and therefore, a type where polyether with a relatively high propylene oxide ratio is graft modified is widely used. A type where a modified polyether terminal is uncapped (hydroxyl group) has an effect of strengthening cell foaming properties, and therefore, types where the polyether terminal is capped (often methoxy capped) are widely used, which aids in simplifying cell membrane communication. The (AB)n polyether modified silicone foam stabilizer according to the present invention is a foam stabilizer containing (A) a high molecular weight main surfactant and (B) a (poly)glycol or a polyglycol derivative as a diluent, and therefore can be suitably used for this system. The formulation for a flexible slab foam is shown, for example, in the examples of Patent Document 12, which can be formulated using the "aromatic hydrocarbon solvent free (AB)n polyether modified silicone foam stabilizer" according to the present invention, instead of the foam stabilizer that is used. However, since the hydroxyl value of the foam stabilizer changes depending on the type and amount of the diluent, it is necessary to finely adjust the amount of isocyanate added so that the cross-link density of the urethane resin system meets the desired design. On the other hand, a soft hot mold formulation contains a urethane raw liquid system that is considerably close to a soft slab formulation, and has high reactivity and is in a packed condition in a mold, and therefore, ensuring high air permeability is important. The (AB)n polyether modified silicone foam stabilizer according to the present invention can achieve high air permeability and can be used in the formulation. The formulation for a flexible hot mold foam is shown, for example, in the examples of Patent Document 3, which can be formulated using the "aromatic hydrocarbon solvent free (AB)n polyether modified silicone foam stabilizer" according to the present invention, instead of the surfactant that is used. However, since the hydroxyl value of the foam stabilizer changes depending on the type and amount of the diluent, it is necessary to finely adjust the amount of isocyanate added so that the cross-link density of the urethane resin system meets the desired design.

A flame retardant foam-compatible type foam stabilizer is defined as a type that can reduced the number of flame retardant additives in the formulation and a type that reduces adverse effects on foam physical properties caused by adding a flame retardant. However, a silicone foam stabilizer is generally positioned as a combustion improver. This is because when the foam is melted in a liquid form by heat, the silicone foam stabilizer gathers on a liquid surface due to a surface activating effect, which prevents carbonization. Therefore, for a flame retardant foam, a foam stabilizer with a relatively low silicone content rate and low foam stabilizing activity. The (AB)n polyether modified silicone foam stabilizer according to the present invention may be used as a flame-retardant foam-compatible foam stabilizer.

High resilience foam (HR foam) is mainly molded foam of an automotive seat or the like, and therefore requires improved moldability and air permeability. The HR foam has high system viscosity and high reactivity, and therefore, stabilization of a cell membrane is relatively simple, but connecting does not advance, and thus problems such as cracking due to gas accumulated inside the foam, shrinking after demolding, and the like must be prevented. Therefore, foam stabilizers with cell opening properties and very weak foam stabilizing capacity are generally widely used. This type is designed with a very low foam stabilizer molecular weight, and initial raw material component emulsification is achieved, but has a feature where the retention capacity of the cell membrane is very weak.

Further, in this system, relatively low molecular weight dimethylpolysiloxane which has not been modified with polyether is said to impart regularity (homogeneity) to the foam cell size, and is used as a foam stabilizer or a surfactant. When combined with polyether-modified silicone, these substances can adjust the strength of the cell openability/foam stabilizing capacity by optimizing the molecular weight distribution while functioning as a foam stabilizing auxiliary agent providing stabilized foam stabilizing activity (moldability).

A type with a stronger foam stabilizing capacity and fine ceiling is suitable for TDI based formulations which require high activity, but on the other hand, a type providing weaker foam stabilizing capacity, favorable crushing properties, and high air permeability is suitable for MDI based formulations with a relatively strong foaming properties. Furthermore, by a type with strong foam stabilizing capacity and a type with weak foam stabilizing capacity, adjusting the cell size and air permeability is widely applied in production, and is a technique unique to the system.

However, polyether modified silicone with a very low molecular weight and dimethylpolysiloxane with a low molecular weight, generally used in high resilience foam applications have a problem of a narrow processing range (degree of freedom of foam formulation or narrowness of permissible range), and in order to resolve this problem, an appropriate amount of the (AB)n polyether modified silicone foam stabilizer according to the present invention can be used in combination. The formulation for a highly elastic foam using the (AB)n polyether modified silicone foam stabilizer is shown in, for example, Patent Document 14, and the "aromatic hydrocarbon solvent free (AB)n polyether modified silicone foam stabilizer" according to the present invention can be used in place of the AB)n type foam stabilizer that was used. However, since the hydroxyl value of the foam stabilizer changes depending on the type and amount of the diluent, it is necessary to finely adjust the amount or the like of isocyanate, polyol, or water that is added so that the cross-link density of the urethane resin system meets the desired design.

The hard urethane foam is lightweight, has excellent heat insulating properties, and high productivity, and therefore is widely used as a heat insulating material for refrigerators and the like and building materials. In order to improve heat insulating properties of the hard urethane foam, making the cell size as fine as possible is important. The number of cells in the finally obtained foam and the number of entrapped gases dispersed during initial urethane foaming liquid stirring essentially match. Therefore, a foam stabilizer that enhances the emulsifying capacity is optimal in initial stirring. On the other hand, as the cells become finer, the foam is prone to shrinking. In this case, a type with relatively low foam stabilizing activity is formulated, and the cell size is increased, and therefore, an effect of preventing shrinking is increased. Note that polyisocyanate foam with excellent flame retardance is classified as a hard urethane foam.

In the hard urethane foam, HCFC141b used as a foaming agent in the past is regulated from the perspective of global environment, and a HFC compound which is a substitute product thereof is moving towards regulations in the near future. An effect provided on the urethane formulation by the foaming agent is large, and an optimal foam stabilizer must be selected based on the type thereof.

In a water formulation and a HFC formulation with a high number of hydrogens, initial emulsifying capacity is reduced as compared to HCFC-141b formulations which had favorable urethane compatibility with a urethane raw material system. Therefore, by formulating a foam stabilizer with high foam stabilizing activity, favorable cells can be expected to be obtained. Furthermore, premixed compatibility may be required in a formulation that uses a hydrocarbon foaming agent such as cyclopentane or the like, from the perspective of storage stability. In this case, compatibility with the foam stabilizer base polyol is important, and a type with a high EO (ethylene oxide) ratio of modified polyether portion and having hydroxyl group (—OH) terminals exhibits relatively favorable compatibility.

(AB)n polyether modified silicones have long been known to be useful in the formation of open-cell rigid urethane foams, and in other words, modified silicones are not suitable for the manufacture of typical rigid foams for insulation applications which require closed cells and fine cells. The formulation for an open cell rigid foam is shown in the Examples of Patent Document 15, but since this is a formulation using Freon gas ($CFCl_3$), which is currently prohibited as a foaming agent, there is a need to adjust the additives and the like to create a formulation for a foam that can replace the foaming agent with one that is less harmful, such as carbon dioxide or water. On the other hand, recently, it has been reported that a foam stabilizer for polyurethane foam containing an (AB)n polyether modified silicone and a specific monool organic compound such as dipropylene glycol monobutyl ether or the like is useful for forming fine cell rigid urethane foam with closed cells (Patent Document 8).

Examples of special foam include: semi-hard foam which is an intermediate material of flexible foam and hard foam and is used as an automotive impact absorber, ceiling material, or the like (Refer to Patent Document 3 for a composition example); low resilience foam derived from soft foam but with a unique application and position due to a unique viscoelastic behavior (also known as shape memory foam or viscoelastic foam); high density foam called integral skin used for shoe soles and the like; microcellular foam manufactured by a mechanical foaming (mechanical flossing) method; and the like. The microcellular foam can be thought of as a type of flexible foam, but generally has high density, and the appearance and feel are close to that of an elastomer. This foam can be used for electronic components, sealing materials, sound absorbing members, vibration absorbing materials, and the like, as well as a carpet backing cushion material. Patent Document 1 and Patent Document 5 show examples of the microcellular foam formulation. The "aromatic hydrocarbon solvent free (AB)n polyether modified silicone foam stabilizer" according to the present invention is preferably used in place of the (AB)n foam stabilizer that was used in these documents. However, since the hydroxyl value of the foam stabilizer changes depending on the type and amount of the diluent, it is necessary to finely adjust the amount of isocyanate added so that the cross-link density of the urethane resin system meets the desired design.

Furthermore, for raw material polyols of urethane foam, foam manufactured using polyester polyols and not general polyether polyols is referred to as ester foam, and has a classification based on foam properties as described above.

Heat insulating properties are important in many applications of hard foam, and therefore, a closed cell type foam with a high foaming rate is normally required, but emphasis is placed on dimensional stability for some applications, and selection of a surfactant or formulation of a foam composition are devised so as to partially open cells. Conversely, with general soft foam, at the moment that formation of a polyurethane structure by a reaction between a polyol and isocyanate and reaction heat and foam rise due to a foaming agent stop due to a structure increasing in strength based on the progress of crosslinking, a formulation is designed such that all cell (foam) membranes in the structure break (open) and are connected (continuously ventilate).

Formulation of low resilience (viscoelastic) foam is similar to general flexible foam formulation, but improvisations are adopted to incorporate a structural element having viscoelasticity in raw material polyol. Therefore, the degree of difficulty of cell connection increases, and the importance of a surfactant having a high open cell effect increases. Furthermore, even in a field of a microcellular foam from a mechanical foaming method or HR foam, various applications are created based on management of the open cell ratio. Foam stabilizers suitable for low resilience urethane foam are classified depending on the type of isocyanate compound that is used. Usually, a formulation using a high-viscosity polymer-based isocyanate such as MDI tends to stabilize the foaming state, so use of a polyether modified silicone foam stabilizer for general flexible foams (main component of an organopolysiloxane backbone with a structure of polyether side chains grafted in) is sufficient. On the other hand, in a formulation using TDI as a main component of isocyanate, the viscosity of the system is low, so it is difficult to stabilize with the above-mentioned general foam stabilizer, and an (AB)n polyether modified silicone foam stabilizer having excellent foam retention ability is required. The formulation for a viscoelastic foam is shown, for example, in the examples of Patent Document 16, which is suitable for formulating using the "aromatic hydrocarbon solvent free (AB)n polyether modified silicone foam stabilizer" according to the present invention, instead of the surfactant that was used. However, since the hydroxyl value of the foam stabilizer changes depending on the type and amount of the diluent, it is necessary to finely adjust the amount of isocyanate added so that the cross-link density of the urethane resin system meets the desired design.

As described above, the "aromatic hydrocarbon solvent free (AB)n polyether modified silicone foam stabilizer" according to the present invention can be used in various foam type polyurethane foam formulations, and can meet the needs of the current polyurethane industry, which requires strict VOC (Volatile Organic Compound) management and emissions management.

Preferably, the "aromatic hydrocarbon solvent free (AB)n polyether modified silicone foam stabilizer" of the present invention is used as a raw material in the following polyurethane foam-forming compositions.

A polyurethane foam-forming composition, comprising:
(a) a polyol;
(b) a polyisocyanate;
(c) a catalyst;
(d) the foam stabilizer according to the present invention; and
(e) optionally, at least one added component selected from a group consisting of foam stabilizers other than component (d), foaming agents, diluents, chain extenders, crosslinking agents, water, non-aqueous foaming agents, fillers, reinforcing agents, pigments, dyes, coloring agents, flame retardants, antioxidants, anti-ozone agents, UV stabilizers, antistatic agents, disinfectants, and antibacterial agents.

The components are outlined below.

(a) Polyol

Examples of polyols include polyether polyols, polyester polyols, and the like. The polyether polyol is obtained by adding an alkylene oxide to a polyhydric alcohol, saccharide, phenol, phenol derivative, aromatic amine, or the like, and examples include polyether polyols obtained adding an alkylene oxide to one type or two or more types of a glycerin, propylene glycol, dipropylene glycol, ethylene glycol, diethylene glycol, trimethylol propane, pentaerythritol, sucrose, sorbital, novolak, nonylphenol, bisphenol A, bisphenol F, tolylenediamine, diphenylmethane diamine, or the like. Other useful polyols include polymer polyols or graft polymer polyols, graft polyols or copolymer polyols, which are dispersions of a vinyl polymer in a base polyol produced by polymerizing a vinyl monomer (normally styrene or acrylonitrile) in a base polymer. This also includes polyols derived from natural materials such as castor oil, chemically modified soybean oil, chemically modified fatty acid oils, and polyols resulting from alkoxylation of natural substances such as castor oil or soybean oil. Examples of the polyester polyols include polyols having a hydroxyl group on a terminal, manufactured by condensation polymerization between an adipic acid, phthalic acid, succinic acid, or other polyfunctional carboxylic acid, and a glycerin, propylene glycol, dipropylene glycol, ethylene glycol, diethylene glycol, trimethylol propane, pentaerythritol, or other polyfunctional hydroxyl compound. One type of polyol may be used independently or two or more types may be used in combination. In order to manufacture a polyurethane foam having less VOC/emission and less odor, it is preferable to add a non-volatile antioxidant to the polyol.

A polyol preferred in preparing the polyurethane foam of the present invention has 2 to 8 hydroxyl groups per molecule, and has a number average molecular weight of 200 to 10,000, and preferably 500 to 7,500. Examples of useful polyether polyols include Voranol220-028, Voranol220-094, Voranol225, Voranol270, Voranol490, and Voranol800 (Dow Chemical Company), Arcol11-34 (Bayer Material Science), and the like.

Polylols such as polyether polyols and polyester polyols have a number of hydroxyls (hydroxyl value) that is normally within a range of approximately 15 to approximately 700. The number of hydroxyls is preferably approximately 20 to 60 for soft foam, approximately 100 to 300 for semi-soft (or semi-hard) foam, and approximately 250 to 700 for hard foam. For soft foam, the preferable functional value, in other words, the number of average hydroxyl groups per polyol molecules of a polyol is approximately 2 to 4, and most preferably approximately 2.3 to approximately 3.5. For hard foam, the preferable functional value is approximately 2 to approximately 8, and most preferably approximately 3 to approximately 5.

The "aromatic hydrocarbon solvent free (AB)n polyether modified silicone foam stabilizer" obtained by the manufacturing method of the present invention can be used as a suitable foam stabilizer for most polyurethane foam formulations. The added amount thereof is within a range where the (AB)n polyether modified silicone foam stabilizer in the straight chain polyether organopolysiloxane block copolymer composition is 0.1 to 10 parts by mass, preferably within a range of 0.5 to 5 parts by mass, and more preferably 1.0 to 3.0 parts by mass with regard to 100 parts by mass of polyols.

(b) Polyisocyanate

Conventionally known polyisocyanates can all be used as organic polyisocyanates, but the most general polyisocyanates include tolylene diisocyanates (hereinafter, referred to as "TDI") and diphenyl methane diisocyanates (hereinafter, referred to as "MDI"). TDI of a mixture of isomers, in other words, 100% 2,4-isomer products, 2,4-isomer/2,6-isomer=80/20, 65/35 (mass ratio), and the like can be used as well as crude TDI containing a polyfunctional tar. A polymeric MDI containing a polynuclear body with 3 or more nuclei can be used as the MDI in addition to pure products primarily containing 4,4'-diphenyl methane diisocyanate. In addition, naphthalene diisocyanate (NDI) is suitable in particular for applications requiring strength.

Of the isocyanate compounds, MDI is normally used in manufacturing hard polyurethane foam, and TDI is often used in manufacturing flexible polyurethane foam.

Of the polyisocyanates, an isocyanate prepolymer of MDI is prepared by reacting the MDI with a polyol, or by combining a compound such as a uretonimine-modified compound with the aforementioned MDI derivatives at an arbitrary ratio. Similarly, a preferable product is a prepolymer containing toluene diisocyanate (TDI) as a raw material, including TDI isocyanate propolymer manufactured by reacting 2,4- and 2,6-isomers of TDI with a polyol, and prepolymers made by combining these with other aromatic or aliphatic polyisocyanates or uretonimine modified polyisocyanates. Mixtures of different types of polyisocyanates can also be used.

The added amount of the polyisocyanate with regard to the amount of isocyanate reactive materials in the formulation is expressed as the "isocyanate index". The 'isocyanate index" is a value obtained by dividing the actual used amount of polyisocyanate by the stoichiometric amount of polyisocyanate required for reacting with a fully active hydrogen in the reaction mixture, and then multiplying by 100. The isocyanate index in the polyurethane foam-forming composition is generally 60 to 140. In general, the isocyanate index is generally 85 to 120 in soft TDI foam, normally 90 to 105 in molded TDI foam which is a high resilience (HR) foam, usually 70 to 90 in molded MDI foam, and generally 90 to 130 in hard MDI foam. Several examples of polyisocyanurate hard foam are manufactured with a high index of 250 to 400.

(c) Catalyst

Examples include nickel acetoacetonates, iron acetoacetonates, tin-based catalysts, bismuth-based catalysts, zinc-based catalysts, titanium-based catalysts, aluminum complexes, zirconium complexes, potassium octylates, potassium acetates, sodium acetates, sodium octylates, metal oxide particles having a solid acid point on a surface, triethylenediamines, bis (dimethyl aminoethyl) ethers and other tertiary amine urethane catalysts, imidazole derivatives, carboxylic acid quaternary ammonium salts, delayed tertiary amine catalysts, general tertiary amine catalysts, low emission tertiary amine catalysts, non-emission tertiary amine catalysts, and DABCO (registered trademark) catalysts. In order to manufacture a polyurethane foam having lower VOC/emission and less odor, it is preferable to use a reactive amine catalyst of a type in which the catalyst is incorporated into the resin backbone during the urethane forming reaction.

Of these catalysts, amine-based catalysts are preferable in manufacturing hard polyurethane foam, and amine-based catalysts and tin-based catalysts are preferably used in combination in manufacturing soft polyurethane foam.

(d) Foam stabilizer for polyurethane foam containing (A) a straight chain polyether organopolysiloxane block copolymer obtained by the manufacturing method of the present invention, and (B) a (poly)glycol or a polyglycol derivative The details of the "aromatic hydrocarbon solvent free (AB)n polyether modified silicone foam stabilizer" of the present invention are as described above, but in general, there is a correlation between the compatibility of the type of polyether modified silicone, which is a main component of the foam stabilizer, and polyurethane foam, and an arrangement of foams suitable for low molecular weight to foams suitable for high molecular weight in order is shown below.

High elastic foam<rigid foam<flexible foam<microcellular foam

Furthermore, the structure of the polyether modified silicone polyether group also greatly affects the size of the foam and the like, and therefore, techniques exist for increasing the molecular weight distribution of a polyether portion and the like, such as selecting a polyether structure with a high amount of EO if reduced cell size and air permeability are desired, selecting a polyether with a high molecular weight if foam stabilization and retention are desired, widening the processing range, using a plurality of polyethers with different molecular weights or structures in raw material in order to have compatibility with a wide range of applications and formulations, and the like, which can also be applied to the (AB)n polyether modified silicone foam stabilizer according to the present invention. Furthermore, a polyol which is one primary raw material of polyurethane has a PPG structure portion, and therefore, a PO (propyleneoxy) chain is often preferably also included in the polyether portion of the polyether modified silicone from the perspective of compatibility in a foam formulation or in a premix.

The requirements of the foam stabilizer will be different based on the type of polyurethane foam containing the "aromatic hydrocarbon solvent free (AB)n polyether modified silicone foam stabilizer", but for example, the surface activating performance, affinity to the urethane foam system, or the like can be controlled based on appropriately adjusting the chain length of the organopolysiloxane having an SiH group on both terminals as expressed by General Formula (4), the type of polyether having an alkenyl group on both terminals as expressed by General Formula (5), the reaction ratio between both components, and the EO/PO % or molecular weight of the polyether portion, and therefore, a suitable foam stabilizer can be freely designed as desired.

(e) Optional Components

Particularly important components of the optional components in the polyurethane foam-forming composition are water and a nonaqueous foaming agent. Water functions as a chemical foaming agent by reacting with polyisocyanate to generate carbon dioxide gas. In addition thereto, one or more physical and/or chemical nonaqueous foaming agent can be included in the reaction mixture. Furthermore, water may not be used based on the formulation. The foaming agents can include HFC-245fa, HFC-134a, and other hydrofluorocarbons, HFO, HCFO, and other hydrofluoroolefins, iso-, cyclo-, and n-pentanes, and other hydrocarbons with a low boiling point, supercritical carbon dioxide gases, formic acids, and the like.

Water is often used as a reactive foaming agent in both soft foam and hard foam. When manufacturing soft foam, water can generally be used at a concentration of 2 to 6.5 parts per 100 parts of polyols for example, and is typically 3.5 to 5.5 parts. Of the high resilience (HR) foam, the amount of water in the TDI molded foam is typically 3 to 4.5 parts for example. In the MDI molded foam, the amount of water is typically 2.5 to 5 parts for example. On the other hand, the amount of water in hard foam is 0.5 to 5 parts, and typically 0.5 to 1 parts for example. A physical foaming agent such as foaming agents with a volatile hydrocarbon, halogenated hydrocarbon, or other non-reactive gas as a base can also be used. Manufactured hard heat insulating foam foams using volatile hydrocarbon or halogenated hydrocarbon at a substantial ratio, and preferable foaming agents include a hydrofluorocarbon (HFC) and pentane or cyclopentane, which are volatile hydrocarbons. A hydrofluoroolefin (HFO, HCFO) can also be used. When manufacturing a soft slab foam, water is the primary foaming agent, but another foaming agent can also be used as an auxiliary foaming agent. In the soft slab foam, a preferable auxiliary foaming agent includes carbon dioxides and dichloromethane. The high resilience (HR) foam generally does not use an inert auxiliary foaming agent, and in any case, has a lower added amount of auxiliary foaming agents than the slab foam. However, in several molding technology, using carbon dioxide is most important. The amount of foaming agent differs based on the desired foam density and foam hardness. The amount when using a hydrocarbon foaming agent is a trace amount or 50 parts per 100 parts of polyols for example, and CO2 is approximately 1 to approximately 10% for example.

However, particularly in microcellular applications, hardness is too low, dimensional accuracy required in final products are difficult to achieve, and tensile strength, wear resistance, and other mechanical strength are insufficient in polyurethane foam by chemical foaming using water, hydrofluorocarbons, hydrocarbons with a low boiling pint, and the like as foaming agents, and therefore, high density foam by mechanical foaming is normally manufactured. In other words, air, nitrogen gas, or the like entrapped by mechanical stirring herein primarily configures the core of an air bubble. However, in applications where low cost is required, such as carpet backing materials, a small amount of water is used as a foaming agent for the purpose of increasing the foam volume, and microcellular foam is manufactured by mechanical foaming using a formulation with a large amount of inorganic filler blended in to increase the strength.

Herein, the polyol a), polyisocyanate b), catalyst c), "aromatic hydrocarbon solvent free (AB)n polyether modified silicone foam stabilizer" of the present invention d), and water, non-aqueous foaming agents, and other components which are optional components e), which can be included in the polyurethane foam-forming composition can be changed over a wide range as described below for example. The compounding ratios and ranges described in the cited patent documents are suitable for each foam type. The reason for allowing a wide range is because the formulation of the polyurethane foam-forming composition must be adjusted based on the required foam properties, applications, foaming forms, devices, and the like.

6 to 85 parts by mass of polyol a), 10 to 80 parts by mass of polyisocyanate b), 0.01 to 5.0 parts by mass of catalyst c), 0.1 to 20 parts by mass of polyether-polysiloxane block copolymer composition of the present invention d), 0 to 6 parts by mass of water as an optional component, and 0 to 45 parts by mass of a nonaqueous foaming agent as an optional component.

Furthermore, the mass of water that can be included in the polyurethane foam-forming composition is preferably within a range of 0 to 10% with regard to the mass of the polyols.

Other optional components e) may include any conventionally known component in the field such as other polymers and/or copolymers, diluting agents, chain extenders, crosslinking agents, fillers, reinforcing agents, pigments, dyes, coloring agents, flame retardants, antioxidants, antiozone agents, UV stabilizers, antistatic agents, disinfectants, and antibacterial agents, within a normal amount range.

For example, the optional component e) can include a polyhydroxyl terminal compound having a molecular weight of 62 to 500 and 2 to 8 hydroxyl groups per molecule, functioning as a crosslinking agent or chain extender. Examples of crosslinking agents having 3 to 8 hydroxyl groups include glycerins, trimethyloylpropanes, pentaerythritols, mannitols, sorbitols, and the like. Examples of useful chain extenders having two hydroxyl groups include dipropylene glycol, tripropylene glycol, propylene glycol, diethylene glycol, triethylene glycol, 1,4-butanediol, 1,3-butanediol, ethylene glycol, 2,3-butanediol, 2-methyl-1,3-propanediol, 1,2-propanediol, 1,3-propanediol, neopentyl glycol, and the like. Diethanol amines, monoethanol amines, and the like can also be used.

Optional component e) may further include an inorganic filler or filler combination, for example. The filler is a filler for physical performance such as density modification, mechanical performance, or sound absorption, or a filler for improving other advantages including flame retardancy, or economics, such as calcium carbonate, for example, including other fillers that reduce the cost of manufacturing foam, aluminum hydroxides, and other flame retardant fillers, barium sulfates, and other high density fillers used for sound absorption, and glass, polymers, and microspheres of other substances that further reduce the foam density. Examples of a filler or reinforcing agent with a high aspect ratio used for modifying the mechanical performance such as foam rigidity or flexibility module include: artificial fibers such as pulverized glass fibers and graphite fibers; natural mineral fibers such as wollastonite; natural plant fibers such as wool or plant fibers such as cotton; artificial plate-shaped fibers such as pulverized glass; and natural mineral plate-shaped fillers such as mica. Any pigment, dye, or coloring agent which may be added is included. Furthermore, an organic flame retardant, anti-ozone agent, or antioxidant; or a thermal or thermal-oxygen decomposition inhibitor, UV stabilizer, or foam-forming composition, or other additive that avoids or inhibits heat, light, and/or chemical decomposition of the produced foam may be included. Arbitrary known and conventional anti-static agents, disinfectants, anti-bacterial agents, and gas fade inhibitors can be included.

The polyurethane foam obtained from the polyurethane foam-forming composition using the "aromatic hydrocarbon solvent free (AB)n polyether modified silicone foam stabilizer" of the present invention is preferable for aromatic hydrocarbon-based solvent-free and low VOC/emission type rigid foams, semi-rigid foams, flexible foams, HR foams, and microcellular foams.

Various existing manufacturing processes can be used as the process for manufacturing a low VOC/emission type polyurethane foam composition using the "aromatic hydrocarbon solvent free (AB)n polyether modified silicone foam stabilizer" of the present invention. For example, for soft foam, polyurethane foam can be manufactured using a one-shot foaming method, a quasi-prepolymer method, and a prepolymer method. General soft foam is normally industrially produced as slab foam. A certain type of slab foam is manufactured by injecting a reactant mixture into a large box (discontinuous method referred to as box foaming), but normal slab stock foam is continuously manufactured by discharged a reaction mixture onto a conveyor with a paper liner. When the foam foams, cures, and exits a foamer as the conveyor advances, the foam is cut into large blocks.

Furthermore, for hard foam, a manufacturing method of dividing more finely is used based on the purpose and application. For example, a method referred to as a "spray foaming" is a method of spray foaming and hardening a polyurethane foam-forming composition at a site such as a construction site or the like. A "lamination board" is primarily used as a heat insulating material for prefabricated buildings, but may also be referred to as a "heat insulating board", "continuous lamination board stock", or the like. When manufacturing the lamination board, a foamed foam-forming composition continuously fed through a roller between surface members mutually facing up and down is cured while flowing to finally obtain a plate-shaped foam with a thickness of approximately 10 cm. An "appliance" is foam exclusively used for heat insulating material for refrigerators, and is produced by a fully automatic process in a factory using an injection molding method. However, in this case, the process ends by injecting, foaming, and curing the foam-forming composition in a metal mold, and the foam is not removed from the metal mold. The formulation characteristics of foam for refrigerators are that water is not used as a foaming agent (due to carbon dioxide gases having a property of easily transferring heat), because an emphasis is placed on heat insulation. "Site injection" is a literal meaning, but is a method that ends by injecting, foaming, and curing the foam-forming composition in a metal mold at the site, and refers to applications other than refrigerators.

With a "microcellular" which is one special foam, a homogenous and fine density foam is manufactured by a mechanical foaming system referred to as mechanical froth system. A so-called foaming agent is not used herein, and air, nitrogen gas, or the like entrapped by mechanical stirring herein primarily configures the core of an air bubble.

Low resilience foam which is a special foam or flexible foam is manufactured by a slab or mold method, similar to general soft foam or HR foam. After flowing a mixed stock solution onto a continuous conveyor, and then normally continuously foaming such that a cross section with 1 to 2 m width and 0.2 to 0.6 m height forms a square or semi-cylindrical shape, a slab product is cut into a bread loaf shape with a predetermined length (often 1 to 2 m). The slab product is shipped in this form to a processing establishment, and a product with various shapes can be cut out and processed from the slab product. After injecting and foaming a stock solution in a plastic or metal mold, a molded product is removed from the die and can be molded in large quantities with dimensional accuracy even with complicated shaped products.

Furthermore, a method of manufacturing an individual polyurethane foam can be appropriately selected, but in particular, the "aromatic hydrocarbon solvent free (AB)n polyether modified silicone foam stabilizer" of the present invention can be suitably used in place of the silicone-based foam stabilizer, silicone surfactant, or silicone copolymer surfactant in the manufacturing method of a polyurethane foam described in the following patent publications or detailed description of the patent publications, and particularly the examples and the like, and can contribute to reducing the VOC and emissions of the foam. Note that the disclosure of the detailed descriptions thereof or examples include disclosures related to a manufacturing device, and a portion of components may be further substituted and manufacturing conditions thereof may be appropriately modified based on changing viscosity or the like, by normal design modifications of a person with ordinary skill in the art.

Manufacturing methods of polyurethane foam described in Japanese PCT Patent Application 2005-534770, Japanese PCT Patent Application 2005-534770, and Japanese PCT Patent Application 2010-535931;

Manufacturing process of open cell polyurethane described in Japanese PCT Patent Application 2010-539280;

Sealing material containing urethane foam described in JP 2012-246397A, JP 2009-265425A, and the like;

Manufacturing of urethane foam described in JP 2012-082273A, JP2010-247532A, JP2010-195870A, JP2002-137234A, and the like Manufacturing of polyurethane foam described in Japanese PCT application 2010-500447, Japanese PCT application 2010-504391, Japanese PCT application 2010-538126, Japanese PCT application 2011-528726, and Japanese PCT application 2013-529702

Note that, in regards to the method of manufacturing the polyether polysiloxane block copolymer composition according to the present invention, a general-purpose polyether modified silicone containing a structure in which a polyether side chain is grafted onto an organopolysiloxane main chain as a main component is synthesized using a saturated hydrocarbon with an average number of carbon atoms of 6 to 11 as a reaction solvent and then substituting the solvent with a (poly)glycol or a (poly)glycol derivative, and thereby it is possible to obtain an aromatic hydrocarbon-based solvent-free and low VOC/emission foam stabilizer for polyurethane foam.

EXAMPLES

Hereinafter, the present invention will be further described in detail based on Examples and Comparative Examples, but the present invention is not limited thereto. Note that in the following composition formulas, a Me$_3$SiO group (or Me$_3$Si group) is expressed as "M", a Me$_2$SiO group is expressed as "D", a MeHSiO group is expressed as "M$^H$", and units where a methyl group in M and D is modified by any substitution group is expressed as M$^R$ and D$^R$.

Example 1-1

A 500 mL reactor was charged with:
58.08 g (14.52 parts) of methylhydrogenpolysiloxane expressed by the average composition formula M$^H$D$_{18}$M$^H$, 141.92 g (35.48 parts) of bismethallyl polyether$^{*)}$ with the average composition formula CH$_2$=C(CH$_3$)CH$_2$—O(C$_2$H$_4$O)$_{35}$(C$_3$H$_6$O)$_{26}$—CH$_2$—C(CH$_3$)=CH$_2$, and 200 g (50 parts) of methylcyclohexane (MCH, boiling point 101° C.) as a reaction solvent, and while stirring under nitrogen flow, 0.05 g of tetramethyldisiloxane solution of 1,3-divinyl-1,1,3,3-tetramethyldisiloxane platinum complex (Pt concentration 4.2 wt %) was added. The oil bath was set at 90° C. to start heating the reactor, and after the appearance of the internal liquid became transparent at around 60 to 70° C., aging was performed at 75 to 85° C. for 3 hours. 1 g of the reaction liquid was collected, and the reaction was confirmed to be completed using an alkali decomposition gas generation method. The oil bath was set to 120° C., the pressure was slowly reduced to around 270 mmHg while heating, about ¾ of MCH was evaporated off while paying attention to foaming, and after re-pressurizing, 200 g (50 parts) of polypropylene glycol monobutyl ether (BPPG-13) expressed by n-BuO(C$_3$H$_6$O)$_{13}$—H was added as the diluent. Here again, pressure was reduced to 5 mmHg or less, the oil bath was set to 130° C. and stripping was performed for 3 hours at an internal liquid temperature of 105 to 120° C.

As a result, an "aromatic hydrocarbon solvent free (AB)n polyether modified silicone foam stabilizer" including: (A) a straight chain polyether organopolysiloxane block copolymer having structural units expressed by the average composition formula

[Formula 13]

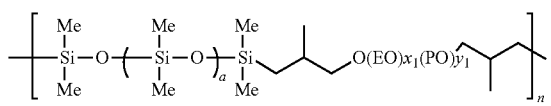

(where a=18, x1=35, y1=26, and n=10), and (B) a polypropylene glycol monobutyl ether {BPPG-13}, at a ratio of 50:50, was obtained as a light brown transparent viscous liquid.

Note that the average composition formula is simply expressed, but the molar ratio of C=C groups and Si—H groups of raw material is such that C=C/SiH and =1.1, and therefore both terminals of the copolymer have a form blocked by a polyether. Note that herein, a polyether portion is a random adduct of ethylene oxide and propylene oxide. This foam stabilizer is particularly suitable for the production of highly breathable microcellular foam or highly breathable low repellency foam that is free of aromatic hydrocarbon-based solvents and has minimal environmental, health, and safety concerns.

*) containing 500 ppm of natural vitamin E

Example 1-2

The test was performed in the same manner as in Example 1-1 except for replacing the MCH with n-heptane (boiling point 98° C.). The reactivity in the synthesis reaction of the straight chain polyether organopolysiloxane block copolymer, behavior such as foaming or the like in the diluent substitution step, and the appearance of the product, and the like was similar to that of Example 1-1. The foam stabilizer can be particularly suitably used in the same applications as in Example 1-1.

Example 1-3

A 1 L reactor was charged with:
58.08 g (14.52 parts) of methylhydrogenpolysiloxane expressed by the average composition formula M$^H$D$_{18}$M$^H$, 141.92 g (35.48 parts) of bismethallyl polyether$^{*)}$ with the average composition formula CH$_2$=C(CH$_3$)CH$_2$—O(C$_2$H$_4$O)$_{35}$(C$_3$H$_6$O)$_{26}$—CH$_2$—C(CH$_3$)=CH$_2$, and 200 g (50 parts) of Isopar E (C$_7$ to C$_9$ saturated hydrocarbon, boiling point 115 to 140° C.) as a reaction solvent,
and while stirring under nitrogen flow, 0.05 g of tetramethyldisiloxane solution of 1,3-divinyl-1,1,3,3-tetramethyldisiloxane platinum complex (Pt concentration 4.2 wt %) was added. The oil bath was set at 75° C. to start heating the reactor, and after the appearance of the internal liquid became transparent at around 70° C., aging was performed at 75 to 80° C. for 3 hours. 1 g of the reaction liquid was collected, and the reaction was confirmed to be completed using an alkali decomposition gas generation method. 200 g (50 parts) of the diluent polypropylene glycol monobutyl ether {BPPG-13} was added, the sample was placed in an oil bath set to 95° C., and then the pressure was slowly reduced to around 60 mmHg while watching for foaming. After foaming had settled, the oil bath was set to 120° C. and stripping was performed for 5 hours at an internal temperature of 100 to 125° C.

Thus, similar to Example 1-1, an "aromatic hydrocarbon solvent free (AB)n polyether modified silicone foam stabilizer" including: (A) a straight chain polyether organopolysiloxane block copolymer, and (B) a polypropylene glycol monobutyl ether {BPPG-13}, at a ratio of 50:50 was obtained. The foam stabilizer can be particularly suitably used in the same applications as in Example 1-1.

*) containing 500 ppm of natural vitamin E

Example 1-4

A 2 L reactor was charged with:
217.80 g (14.52 parts) of methylhydrogenpolysiloxane expressed by the average composition formula $M^H D_{17} M^H$,
532.20 g (35.48 parts) of bismethallyl polyether*) with the average composition formula $CH_2\!=\!C(CH_3)CH_2\!-\!O(C_2H_4O)_{35}(C_3H_6O)_{26}\!-\!CH_2\!-\!C(CH_3)\!=\!CH_2$,
0.75 g of natural vitamin E, and
750 g (50 parts) of 2,2,4-trimethylpentane (isooctane, boiling point 99° C.) as a reaction solvent,
and while stirring under nitrogen flow, 0.17 g of a tetramethyldisiloxane solution of 1,3-divinyl-1,1,3,3-tetramethyldisiloxane platinum complex (Pt concentration 4.2 wt %) was added. The oil bath was set at 95° C. to start heating the reactor, and after the appearance of the internal liquid became transparent at around 80 to 90° C., aging was performed for 2 hours. 1 g of the reaction liquid was collected, and the reaction was confirmed to be completed using an alkali decomposition gas generation method. The oil bath was set to 130 to 170° C., the pressure was slowly reduced to around 310 to 40 mmHg while heating, about ¾ of isooctane was evaporated off while paying attention to foaming, and after re-pressurizing, 750 g (50 parts) of polypropylene glycol monobutyl ether (BPPG-13) was added as the diluent. Here again, pressure was reduced to 20 mmHg or less, the oil bath was set to 150° C. and stripping was performed for 4 hours at an internal liquid temperature of 130 to 145° C.
As a result, similar to Example 1-1, an "aromatic hydrocarbon solvent free (AB)n polyether modified silicone foam stabilizer" including: (A) a straight chain polyether organopolysiloxane block copolymer, and (B) a polypropylene glycol monobutyl ether {BPPG-13}, at a ratio of 50:50 was obtained. The foam stabilizer can be particularly suitably used in the same applications as in Example 1-1.
*) containing 500 ppm of natural vitamin E Comparative Example 1-1

The experiment was performed in the same manner as in Example 1-3 substituting Isopar E (C7-C9 saturated hydrocarbon, boiling range 115-140° C.) with IP solvent 1620 (mixture containing at least C12-C13 saturated hydrocarbons, boiling point 166-202° C.). The reactivity and appearance in the synthesis reaction of the straight chain polyether organopolysiloxane block copolymer was similar to Example 1-3, but after the addition of a diluent polypropylene glycol monobutyl ether {BPPG-13}, intense foaming under reduced pressure persisted in the step of substituting with the reaction solvent and transitioning to a stripping keep state where it took six or more hours for the foaming to subside.

Comparative Example 1-2

A 1 L reactor was charged with:
58.08 g (14.52 parts) of methylhydrogenpolysiloxane expressed by the average composition formula $M^H D_{18} M^H$,
141.92 g (35.48 parts) of bismethallyl polyether*) with the average composition formula $CH_2\!=\!C(CH_3)CH_2\!-\!O(C_2H_4O)_{35}(C_3H_6O)_{26}\!-\!CH_2\!-\!C(CH_3)\!=\!CH_2$, and
200 g (50 parts) of acetone (boiling point 56° C.) as a reaction solvent,
and while stirring under nitrogen flow, 0.05 g of tetramethyldisiloxane solution of 1,3-divinyl-1,1,3,3-tetramethyldisiloxane platinum complex (Pt concentration 4.2 wt %) was added. An oil bath was set to 60-70° C. to begin heating of the reactor and aging was performed for 2 hours under reflux conditions of acetone at around 60, but due to turbidity in the appearance of the internal liquid and a low reaction rate, the aforementioned 0.05 g of platinum catalyst was added. After aging for an additional 3 hours, the reaction was complete, while the appearance remained cloudy. The pressure was gradually reduced to 40 mm Hg, and then the acetone was distilled off, after which pressure was returned to normal and 200 g (50 parts) of the diluent polypropylene glycol monobutyl ether {BPPG-13}, was added. The foaming in this solvent-diluent exchange step was low. Here again, pressure was reduced to 5 mmHg or less, the oil bath was set to 120 to 130° C. and stripping was performed for one hour at an internal temperature of 100 to 120° C. to obtain a grayish brown opaque viscous liquid.

Comparative Example 1-3

A 1 L reactor was charged with:
58.08 g (14.52 parts) of methylhydrogenpolysiloxane expressed by the average composition formula $M^H D_{18} M^H$,
141.92 g (35.48 parts) of bismethallyl polyether*) with the average composition formula $CH_2\!=\!C(CH_3)CH_2\!-\!O(C_2H_4O)_{35}(C_3H_6O)_{26}\!-\!CH_2\!-\!C(CH_3)\!=\!CH_2$, and
200 g (50 parts) of ethyl acetate (boiling point 77° C.) as a reaction solvent,
and while stirring under nitrogen flow, 0.05 g of tetramethyldisiloxane solution of 1,3-divinyl-1,1,3,3-tetramethyldisiloxane platinum complex (Pt concentration 4.2 wt %) was added. An oil bath was set to 70-80° C. to begin heating of the reactor and aging was performed for 2 hours under reflux conditions of ethyl acetate at around 80° C., but due to turbidity in the appearance of the internal liquid and a low reaction rate, the aforementioned 0.05 g of platinum catalyst was added. After aging for an additional 3 hours, the reaction was complete, while the appearance remained cloudy. 200 g (50 parts) of the diluent polypropylene glycol monobutyl ether {BPPG-13} was added and the oil bath was set to 120° C. and ethyl acetate was removed by gradually depressurizing the reaction system, but intense foaming occurred and it took six hours to reduce pressure to 50 mmHg or less. There was also intense boiling during the process. The appearance of the resulting liquid was a grayish brown opaque viscous liquid.

Comparative Example 1-4

A 1 L reactor was charged with:
141.92 g (35.48 parts) of bismethallyl polyether*) expressed by the average composition formula $CH_2\!=\!C(CH_3)CH_2\!-\!O(C_2H_4O)_{35}(C_3H_6O)_{26}\!-\!CH_2\!-\!C(CH_3)\!=\!CH_2$, and
0.08 g of a 5% sodium acetate methanol solution, and pressure was reduced to 30 mmHg at 80° C. over a one hour period to remove the methanol. Thereafter,
58.08 g (14.52 parts) of methylhydrogenpolysiloxane expressed by the average composition formula $M^H D_{18} M^H$, and
200 g (50 parts) of isopropyl alcohol (IPA, boiling point 82° C.) as a reaction solvent were added,
and while stirring under nitrogen flow, 0.05 g of tetramethyldisiloxane solution of 1,3-divinyl-1,1,3,3-tetramethyldisiloxane platinum complex (Pt concentration 4.2 wt %) was added. After confirming the transparency of the reaction solution at 75° C., aging was performed at approximately 80° C. for 3 hours, and the reaction was complete. 200 g (50 parts) of the diluent polypropylene glycol monobutyl ether {BPPG-13} was added and the oil bath was set to 120° C. and IPA was removed by gradually depressurizing the reaction system, but intense foaming occurred and it took six hours to reduce pressure to 50 mmHg or less. There was also intense boiling during the process. The appearance and the like of the product were the same as in Example 1-1.

Comparative Example 1-5

A 1 L reactor was charged with:
14.52 parts of methylhydrogenpolysiloxane expressed by the average composition formula $M^H D_{18} M^H$,
35.48 parts of bismethallyl polyether expressed by the average composition formula $CH_2=C(CH_3)CH_2-O(C_2H_4O)_{35}(C_3H_6O)_{26}-CH_2-C(CH_3)=CH_2$, and
70 parts of toluene as a reaction solvent,
and was heated while stirring to 70 to 80° C. while under nitrogen flow. A 10% IPA solution (Pt concentration 3.8 wt %) of chloroplatinic acid was added at a 10 ppm equivalent amount of Pt and the appearance became transparent at approximately 85° C. The reaction was then performed for 2 hours. 1 g of the reaction liquid was collected, and the reaction was confirmed to be completed using an alkali decomposition gas generation method. The reaction system was further heated to 125° C. while gradually reducing pressure, and then the toluene was gradually distilled while paying attention to causes of foaming. Pressure was restored at a stage where approximately ¾ of the toluene was removed, and after 25 parts of polypropylene glycol monobutyl ether {BPPG-13} was added to the reaction system, the pressure was again reduced and the remaining toluene was carefully distilled. Pressure was restored, 25 parts of BPPG-13 was added and then homogeneously mixed. Thus, a straight chain organopolysiloxane-polyether block copolymer containing a structural unit as expressed by the average composition formula:

[Formula 14]

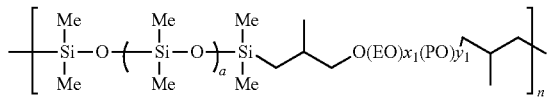

(Where a=18, x1=35, y1=26, and n=6)
with a polyurethane foam stabilizer containing a straight chain polyether organopolysiloxane block copolymer and polypropylene glycol monobutyl ether {BPPG-13} in a ratio of 50:50 was obtained.
Note that the average composition formula is simply expressed, but the molar ratio of C=C groups and Si—H groups of raw material is approximately 7:6, and therefore, both terminals of the copolymer have a form blocked by a polyether. Furthermore, a portion of the Si—H groups in the reaction can cause a dehydrogenative condensation reaction with a hydroxyl group of the IPA, and therefore, a portion of the copolymer terminal is considered to include a structure of SiO-iPr. Note that herein, a polyether portion is a random adduct of ethylene oxide and propylene oxide.

Comparative Example 1-6

When tests were performed in the same manner as in Comparative Example 1-5 except that the number of parts of toluene used was changed from 70 parts to 50 parts, the appearance was opaque after the reaction was completed. Therefore, the test was suspended without performing the subsequent replacement step of the solvent-diluent.

Example 2-1

A 300 mL reactor was charged with:
31.64 g (15.82 parts) of methylhydrogenpolysiloxane expressed by the average composition formula $M^H D_{18} M^H$,
68.36 g (34.18 parts) of bismethallyl polyether*) with the average composition formula $CH_2=C(CH_3)CH_2-O(C_2H_4O)_{38}(C_3H_6O)_{19}-CH_2-C(CH_3)=CH_2$, and
100 g (50 parts) of Isopar E ($C_7$ to $C_9$ saturated hydrocarbon, boiling point 115 to 140° C.) as a reaction solvent,
and while stirring under nitrogen flow, 0.03 g of a tetramethyldisiloxane solution of 1,3-divinyl-1,1,3,3-tetramethyldisiloxane platinum complex (Pt concentration 4.2 wt %) was added. The oil bath was set at 80° C. to start heating the reactor, and after the appearance of the internal liquid became transparent at around 80-85° C., aging was performed for 3 hours. 1 g of the reaction liquid was collected, and the reaction was confirmed to be completed using an alkali decomposition gas generation method. 300 g (150 parts) of the diluent polypropylene glycol monobutyl ether {BPPG-13} was added, the sample was placed in an oil bath set to 100 to 115° C., and then the pressure was slowly reduced to 30 mmHg or lower while watching for foaming. Stripping was performed at a temperature of 110-120° C. for 1.5 hours.
As a result, an "aromatic hydrocarbon solvent free (AB)n polyether modified silicone foam stabilizer" including: (A) a straight chain polyether organopolysiloxane block copolymer having structural units expressed by the average composition formula

[Formula 15]

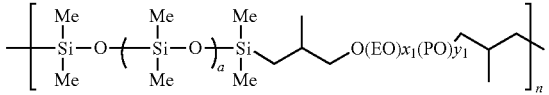

(where a=18, x1=38, y1=19, and n=20), and (B) a polypropylene glycol monobutyl ether {BPPG-13}, at a ratio of 25:75, was obtained as a light yellow transparent liquid.
Note that the average composition formula is simply expressed, but the molar ratio of C=C groups and Si—H groups of raw material is such that C=C/SiH=1.05, and therefore both terminals of the copolymer have a form blocked by a polyether. Note that herein, a polyether portion is a random adduct of ethylene oxide and propylene oxide.
*) containing 500 ppm of natural vitamin E
This foam stabilizer is particularly suitable for the manufacture of low-density microcellular foam which does not contain aromatic hydrocarbon-based solvents and has few concerns about environment, hygiene and safety, and for the miniaturization of the cell size of microcellular foam.

Example 2-2

The test was performed in the same manner as in Example 2-1 except for replacing Isopar E with methylcyclohexane (MCH, boiling point 101° C.). The reactivity in the synthesis reaction of the straight chain polyether organopolysiloxane block copolymer and the appearance of the product were the same as in Example 2-1, and foaming in the substitution step with the diluent was favorable, less than that of Example 2-1. The foam stabilizer can be particularly suitably used in applications similar to Example 2-1.

Comparative Example 2-1

The test was performed in the same manner as in Example 2-1 substituting Isopar E (C7-C9 saturated hydrocarbon, boiling range 115-140° C.) with IP solvent 1620 (mixture containing at least C12-C13 saturated hydrocarbons, boiling point 166-202° C.). The reactivity and appearance in the synthesis reaction of the straight chain polyether organopolysiloxane block copolymer was similar to Example 1-3, but after the addition of a diluent polypropylene glycol monobutyl ether {BPPG-13}, foaming more severe than in Example 2-1 occurred under reduced pressure in the step of substituting with the reaction solvent, and therefore it was necessary to reduce the pressure slowly while being very careful. Stripping was performed for 1.5 hours at an internal liquid temperature of 105-115° C. at a pressure of 50 mmHg or less.

Comparative Example 2-2

A 1 L reactor was charged with:
68.36 g (34.18 parts) of bismethallyl polyether*) expressed by the average composition formula $CH_2=C(CH_3)CH_2-O(C_2H_4O)_{38}(C_3H_6O)_{19}-CH_2-C(CH_3)=CH_2$, and
0.08 g of a 5% sodium acetate methanol solution, and pressure was reduced to 30 mmHg at 80° C. over a one hour period to remove the methanol. Thereafter,
31.64 g (15.82 parts) of methylhydrogenpolysiloxane expressed by the average composition formula $M_H D_{18} M_H$, and
200 g (50 parts) of isopropyl alcohol (IPA, boiling point 82° C.) as a reaction solvent were added,
and while stirring under nitrogen flow, 0.05 g of tetramethyldisiloxane solution of 1,3-divinyl-1,1,3,3-tetramethyldisiloxane platinum complex (Pt concentration 4.2 wt %) was added. Next, aging was performed at approximately 80° C. for 3 hours, and the reaction was complete. 300 g (75 parts) of the diluent polypropylene glycol monobutyl ether {BPPG-13} was added and the oil bath was set to 120° C. and IPA was removed by gradually depressurizing the reaction system, but very persistent foaming occurred and it took 7 hours to reduce the pressure to 50 mmHg or less. There was also intense boiling during the process. The appearance and the like of the product were the same as in Example 2-1.

Physical Properties of the Foam Stabilizer According to Examples and Comparative Examples The following Table 1 and Table 2 show the design structures, contents, appearances, kinematic viscosity (mm2/s) at 25° C., number average molecular weight Mn of the main component (A) by GPC, and the like of the obtained foam stabilizers for the aforementioned Examples 1-1 to 1-4, Examples 2-1 and 2-2, Comparative Examples 1-1 to 1-5, and Comparative Examples 2-1 and 2-2.

Note that all of the above-mentioned foam stabilizers contain the following straight chain polyether organopolysiloxane block copolymer as component (A).

[Formula 16]

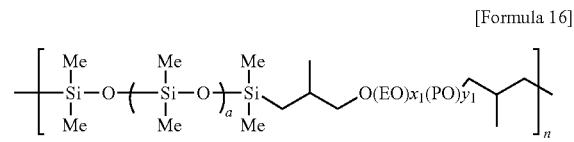

Note that all of the above-described foam stabilizers contain polypropylene glycol monobutyl ether {BPPG-13} described below as component (B).

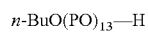

TABLE 1

Design structures, contents, and the like of foam stabilizers obtained in the examples

| Example No. | Reaction Catalyst (No. of Carbon atoms) | Properties of foam stabilizer | | Structure of Copolymer (A) | | | | Mn of Copolymer (A) | (A)/(B) |
|---|---|---|---|---|---|---|---|---|---|
| | | Appearance | Viscosity | a | x1 | y1 | n | | |
| 1-1 | MCH (C7) | Transparent | 59,400 | 18 | 35 | 26 | 10 | 64,700 | 50/50 |
| 1-2 | n-Heptane (C7) | Transparent | 43,600 | 18 | 35 | 26 | 10 | 61,200 | 50/50 |
| 1-3 | Isopar E (C7-C9) | Transparent | 62,500 | 18 | 35 | 26 | 10 | 63,900 | 50/50 |
| 1-4 | Iso-octane (C8) | Transparent | 45,300 | 17 | 35 | 26 | 10 | 58,100 | 50/50 |
| 2-1 | Isopar E (C7-C9) | Transparent | 4,780 | 18 | 38 | 19 | 20 | 76,800 | 25/75 |
| 2-2 | MCH (C7) | Transparent | 6,170 | 18 | 38 | 19 | 20 | 85,000 | 25/75 |

TABLE 2

Design Structure, Content, etc. of Foam Stabilizer Obtained in Comparative Examples

| Comparative Example No. | Reaction Catalyst (No. of Carbon atoms) | Properties of foam stabilizer | | Structure of Copolymer (A) | | | | Mn of Copolymer (A) | (A)/(B) |
|---|---|---|---|---|---|---|---|---|---|
| | | Appearance | Viscosity | a | x1 | y1 | n | | |
| 1-1 | IP-1620 (Including C12-C13) | Transparent | 55,500 | 18 | 35 | 26 | 10 | 62,700 | 50/50 |
| 1-2 | Acetone | Turbid | No data | 18 | 35 | 26 | 10 | No data | 50/50 |
| 1-3 | Ethyl acetate | Turbid | No data | 18 | 35 | 26 | 10 | No data | 50/50 |
| 1-4 | IPA | Transparent | 14,500 | 18 | 35 | 26 | 12 | 44,300 | 50/50 |
| 1-5 | Toluene (C7, Aromatic) | Transparent | 14,600 | 18 | 35 | 26 | 6 | 44,500 | 50/50 |
| 2-1 | IP-1620 (Including C12-C13) | Transparent | 5,910 | 18 | 38 | 19 | 20 | 85,700 | 25/75 |
| 2-2 | IPA | Transparent | 5,790 | 18 | 38 | 19 | 20 | 85,200 | 25/75 |

The measurement conditions in the aforementioned GPC analysis are as follows.
"GPB Measurement Conditions"
Eluent: Chloroform (special grade reagent)
Measurement temperature: 40° C.
Detector: Refractometer (peak detection on the plus side)
Flow velocity: 1.0 mL/min
Calibration: Performed with standard polystyrene
Injection amount of sample solution: 100 μL (sample concentration 1% by weight)

Suitability of the Reaction Solvents of the Examples and Comparative Examples to a Foam Stabilizer Manufacturing Process The suitability of each solvent is listed, from the perspective of compliance with aromatic hydrocarbon-based solvent-free (non-use) requirements, productivity during foam stabilizer manufacturing (including ease of process, degree/time of foaming phenomenon and safety), hydrosilylation reactivity, and product appearance (compatibility (presence or absence of turbidity), and the like), for each of the reaction solvents used in Examples 1-1 to 1-5, Examples 2-1 and 2-3, 2-5, Comparative Examples 1-1 to 1-5, and Comparative Examples 2-1 and 2-4.

Note that the reactivity, compatibility, and productivity determination criteria were as follows.

Reactivity

"Excellent": The reaction solvent was essentially inert with respect to the hydrosilylation reaction and completion of the reaction by aging in the reaction step was confirmed within 2 to 3 hours "Good": Side reactions can occur because the reaction solvent has a hydroxyl group, but the side-reactions can be suppressed by improving the formulation using a buffer component, and the hydrosilylation reaction was completed within 2 to 3 hours of aging "Acceptable": Completion of the hydrosilylation reaction was not completed by aging for 2 to 3 hours, but the reaction was completed after addition of a catalyst in an amount equal to or less than the initial amount and aging for an additional 3 hours "Poor": The hydrosilylation reaction was slow, and the reaction was not completed even after more than 6 hours despite the above-described action Compatibility "Excellent": The reaction solvent is essentially inert with respect to the hydrosilylation reaction, and the appearance of the solution at the end of the reaction is transparent (Because it is thought that compatibility was demonstrated between both the organopolysiloxane and the polyether that are the raw materials of the reaction solvent that was used, and contact and reaction was promoted between the two components)

"Good": The reaction solvent is essentially inert to the hydrosilylation reaction and the appearance of the solution at the end stage of the reaction was uniform translucent to substantially transparent "Acceptable": Cases where a buffer component is added to suppress side-reactions of Si—O—C formation, such as when using an alcohol-based solvent, and a transparent to translucent uniform solution appearance was obtained in the reaction end stage "Poor": The solution appearance was opaque at the end of the reaction stage, and the turbidity was also severe Productivity "Good": The process can proceed safely while controlling the foaming in the solvent-diluent substitution step, and it is determined that the time to reach the state of Full vacuum operation is the same level as the current product where "reaction solvent=toluene" (2 to 3 hours on a laboratory scale)

"Acceptable": The process can proceed safely while controlling the foaming in the solvent-diluent substitution step, and it is determined that the time to reach the state of Full vacuum operation is slightly longer than where "reaction solvent=toluene" (4 to 5 hours on a laboratory scale)

"Poor": The process can proceed while somehow controlling the foaming in the solvent-diluent substitution step, and it was determined that the time to reach the state of Full vacuum operation is much longer than the case where "reaction solvent=toluene" (over 6 hours on a laboratory scale), and the process is not thought to be practical as production activity "Unacceptable": Process control is difficult due to intense and persistent foaming in the solvent-diluent replacement process, and boiling occurs even with careful decompression, or the product appearance becomes cloudy and out of specification, so the process cannot be applied to production

TABLE 3

Properties of Reaction Solvent Used in Examples and
Suitability for Foam Stabilizer Manufacturing Process

| Example No. | Reaction Catalyst Name | No. of Carbon atoms | Boiling Point | Flash Point | Suitability for Foam Stabilizer Manufacturing Process | | | |
|---|---|---|---|---|---|---|---|---|
| | | | | | Reactivity | Compatibility | Productivity | BTX free |
| 1-1 | MCH | C7 | 101 | −4 | Excellent | Excellent | Good | Compliant |
| 1-2 | n-Heptane | C7 | 98 | −4 | Excellent | Excellent | Good | Compliant |
| 1-3 | Isopar E | C7-C9 | 115-140 | 7 | Excellent | Excellent | Pass | Compliant |
| 1-4 | Isooctane | C8 | 99 | −12 | Excellent | Excellent | Pass | Compliant |
| 2-1 | Isopar E | C7-C9 | 115-140 | 7 | Excellent | Excellent | Good | Compliant |
| 2-2 | MCH | C7 | 101 | −4 | Excellent | Excellent | Good | Compliant |

TABLE 4

Properties of the Reaction Solvent Used in Comparative Example
and Suitability for Foam Stabilizer Manufacturing Process

| Comparative Example No. | Reaction Catalyst Name | No. of Carbon atoms | Boiling Point | Flash Point | Suitability for Foam Stabilizer Manufacturing Process | | | |
|---|---|---|---|---|---|---|---|---|
| | | | | | Reactivity | Compatibility | Productivity | BTX free |
| 1-1 | IP-1620 | Including C12-C13 | 166-202 | 49 | Excellent | Excellent | Poor | Compliant |
| 1-2 | Acetone | C3 | 56 | −17 | Pass | Poor | Not Applicable | Compliant |
| 1-3 | Ethyl acetate | C4 | 77 | 7 | Pass | Poor | Not Applicable | Compliant |
| 1-4 | IPA | C3 | 82 | 12 | Good | Applicable* | Not Applicable | Compliant |
| 1-5 | Toluene | C7 | 111 | 4 | Excellent | Good # | Good | Incompatible |
| 2-1 | IP-1620 | Including C12-C13 | 166-202 | 49 | Excellent | Excellent | Poor | Compliant |
| 2-2 | IPA | C3 | 82 | 12 | Good | Applicable* | Not Applicable | Compliant |

*When IPA is used, it is necessary to add a buffer component such as sodium acetate that controls the side-reactions that form Si—O—C in order to achieve an increase in the molecular weight of the (AB)n copolymer. Otherwise, the reaction rate of hydrosilylation may decrease and the appearance of the product may become turbid, so it was determined the compatibility of the reaction solvent was acceptable.
Toluene is not a "saturated hydrocarbon solvent with an average number of carbon atoms of 6 to 11", and does not provide a product with a transparent appearance when 50 parts are used (Comparative Example 1-6), and a product with a transparent appearance was finally achieved after using 70 parts, so the compatibility was "good".

From the above results, it can be seen that the "aromatic hydrocarbon solvent free (AB)n polyether modified silicone foam stabilizer" can be efficiently and safely manufactured by selecting a saturated hydrocarbon with an average number of carbon atoms of 6 to 11 as a synthesis reaction solvent for the (AB)n copolymer, and using a manufacturing method for a polyether polysiloxane block copolymer composition that includes a step where this solvent is replaced with (poly)glycol or a (poly)glycol derivative. A saturated hydrocarbon with an average number of carbon atoms of 6 to 11 is excellent as a synthesis reaction solvent for (AB)n copolymers, and it was determined that a transparent product appearance could be achieved with a smaller amount of toluene than is conventionally used. The foam stabilizer thus obtained can be used as a raw material for an aromatic hydrocarbon-based solvent-free and low VOC/emission polyurethane foam or a premix therefor, and contributes to increasing the scope of usefulness for automobile components and consumer goods (bed mats, sofas, pillows, and the like) that can be used in the field of foam for electronic materials and the environment.

Example 3-1

A 2 L reactor was charged with:
84.30 g (11.24 parts) of methylhydrogenpolysiloxane expressed by the average composition formula $M^H D_{14} M^H$, 215.70 g (28.76 parts) of bismethallyl polyether*) expressed by the average composition formula $CH_2$=$C(CH_3)CH_2$—$O(C_2H_4O)_{39}(C_3H_6O)_{20}$—$CH_2$—$C(CH_3)$=$CH_2$, and 300 g (40 parts) of methylcyclohexane (MCH, boiling point 101° C.) as a reaction solvent, the oil bath was set to 90° C., and then heating and mixing was initiated under a nitrogen flow. 0.13 g of a 10 wt % IPA solution (Pt concentration of 4.8 wt %) of chloroplatinic acid was added, and after 15 minutes, the internal liquid reached 79° C. and the appearance was clear. Therefore, aging was performed for 3.5 hours. 1 g of the reaction liquid was collected, and the reaction was confirmed to be completed using an alkali decomposition gas generation method. The oil bath was set to 110° C., the pressure was slowly reduced to around 270 to 110 mmHg while heating, about ¾ of MCH was evaporated off while paying attention to foaming, and after re-pressurizing, 225 g (30 parts) of polypropylene glycol expressed by HO(C₃H₆O)₇—H was added as the first diluent. Next, the oil bath was set to 140° C., the pressure was slowly reduced to 190 to 20 mmHg while heating, the remaining MCH was evaporated off while paying attention to foaming, and after re-pressurizing, 225 g (30 parts) of polypropylene glycol expressed by HO(C₃H₆O)₃₄—H was added as the second diluent. The internal liquid was mixed to uniformity.

As a result, an "aromatic hydrocarbon solvent free (AB)n polyether modified silicone foam stabilizer" including: (A) a straight chain polyether organopolysiloxane block copolymer having structural units expressed by the average composition formula

[Formula 17]

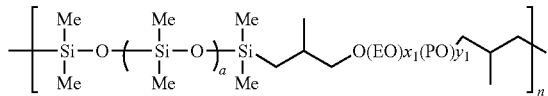

(where a=14, x1=39, y1=20, and n=20), and (B) a polypropylene glycol (including equal masses of 2 monomers, namely 7-mer and 34-mer) at a ratio of 40:60, was obtained as a light brown transparent viscous liquid.

The kinematic viscosity of the foam stabilizer was 29,600 mm2/s (25° C.). Note that the average composition formula is simply expressed, but the molar ratio of C=C groups and Si—H groups of raw material is such that C=C/SiH=about 1.05, and therefore, both terminals of the copolymer have a form blocked by a polyether. Note that herein, a polyether portion is a random adduct of ethylene oxide and propylene oxide.

This foam stabilizer is particularly suitable for manufacturing a low breathability microcellular foam or manufacturing a low density microcellular foam, which does not contain aromatic hydrocarbon-based solvents and has few concerns about environment, hygiene and safety.*⁾ Containing 500 ppm of natural vitamin E Example 3-2

A 2 L reactor was charged with:
92.48 g (12.33 parts) of methylhydrogenpolysiloxane expressed by the average composition formula $M^H D_{17} M^H$,
207.53 g (27.67 parts) of bismethallyl polyether*) expressed by the average composition formula CH₂=C(CH₃)CH₂—O(C₂H₄O)₃₉(C₃H₆O)₂₀—CH₂—C(CH₃)=CH₂, and
300 g (40 parts) of methylcyclohexane (MCH, boiling point 101° C.) as a reaction solvent, the oil bath was set to 90° C., and then heating and mixing was initiated under a nitrogen flow. 0.13 g of a 10 wt % IPA solution (Pt concentration of 4.8 wt %) of chloroplatinic acid was added, and after 20 minutes, the internal liquid reached 77° C. and the appearance was clear. Therefore, aging was performed for approximately 3 hours. 1 g of the reaction liquid was collected, and the reaction was confirmed to be completed using an alkali decomposition gas generation method. The oil bath was set to 120° C., the pressure was slowly reduced to around 280 to 110 mmHg while heating, about ¾ of MCH was evaporated off while paying attention to foaming, and after re-pressurizing, 225 g (30 parts) of polypropylene glycol expressed by HO(C₃H₆O)₇—H was added as the first diluent. Next, the oil bath was set to 135° C., the pressure was slowly reduced to 170 to 6 mmHg while heating, the remaining MCH was evaporated off while paying attention to foaming, and after re-pressurizing, 225 g (30 parts) of polypropylene glycol expressed by HO(C₃H₆O)₃₄—H was added as the second diluent. The internal liquid was mixed to uniformity.

As a result, an "aromatic hydrocarbon solvent free (AB)n polyether modified silicone foam stabilizer" including: (A) a straight chain polyether organopolysiloxane block copolymer having structural units expressed by the average composition formula

[Formula 18]

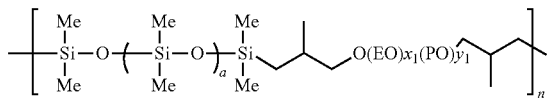

(where a=17, x1=39, y1=20, and n=20), and (B) a polypropylene glycol (including equal masses of 2 monomers, namely 7-mer and 34-mer) at a ratio of 40:60, was obtained as a light brown transparent viscous liquid.

The kinematic viscosity of this foam stabilizer was 33,400 mm2/s (25° C.). Note that the average composition formula is simply expressed, but the molar ratio of C=C groups and Si—H groups of raw material is such that C=C/SiH=about 1.05, and therefore, both terminals of the copolymer have a form blocked by a polyether. Note that herein, a polyether portion is a random adduct of ethylene oxide and propylene oxide.

This foam stabilizer is particularly suitable for manufacturing of a low breathability microcellular foam or manufacturing of a low density microcellular foam, which does not contain aromatic hydrocarbon-based solvents and has few concerns about environment, hygiene and safety.*⁾ Containing 500 ppm of natural vitamin E Example 3-3

The experiment is performed in the same manner as in Example 1-1, except that 0.05 g of a tetramethyldisiloxane solution (Pt concentration of 4.2 wt %) of 1,3-divinyl-1,1,3,3-tetramethyldisiloxane platinum complex is replaced by 0.06 g of a 10% IPA solution of chloroplatinic acid (3.8 wt % Pt concentration). The reactivity and transparency of the composition in the synthesis reaction of the straight chain polyether organopolysiloxane block copolymer is the same as in Example 1-1, and behavior such as foaming in the substitution step with the diluent is suppressed. This reason is because, when a portion of the SiH group is reacted with the hydroxyl group of the alcohol, when an alcohol solution of chloroplatinic acid is utilized, the viscosity of the reaction system is slightly reduced because the molecular weight of the straight chain polyether organopolysiloxane block copolymer (A) is somewhat reduced. The foam stabilizer can be particularly suitably used in the same applications as in Example 1-1.

The invention claimed is:
1. A method of manufacturing a polyether polysiloxane block copolymer composition, the method comprising:
   (I) obtaining (A) a polyether polysiloxane block copolymer by reacting i) and ii) in the presence of (C) a saturated hydrocarbon solvent with an average number of carbon atoms of 6 to 11 i) an organopolysiloxane having a reactive group on both terminals of the molecule, expressed by the following structural formula:

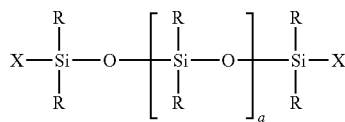

where a represents a number from 1 to 200, each R independently represents a monovalent hydrocarbon group having from 1 to 9 carbon atoms and not having an aliphatic unsaturated bond, and each X represents a reactive group selected from the group consisting of hydroxyl groups, alkoxy groups, dimethylamino groups, hydrogen atoms, halogen atoms, carbamate groups, and or other leaving groups; and ii) a polyether compound having a condensation reactive or hydrosilylation reactive group at both ends of the molecular chain; and (II) either after or during step (I), replacing solvent (C) with (B) a (poly) glycol or a polyglycol derivative as a diluent.

2. The method of manufacturing a polyether polysiloxane block copolymer composition according to claim 1, wherein the polyether polysiloxane block copolymer (A) is a copolymer having intramolecular component units expressed by the following General Formula (1) or General Formula (2);

General Formula (1)

where each R independently represents a monovalent hydrocarbon group having 1 to 9 carbon atoms without an aliphatic unsaturated bond, x represents a number from 2 to 4, a represents a number from 1 to 200, y is a number in the range from 400 to 5000 and represents the molecular weight of the polyether portion expressed by $(C_xH_{2x}O)_y$, n represents a number that is at least 2, and Y represents a divalent hydrocarbon group having from 2 to 8 carbon atoms, which is bonded to a polyoxyalkylene block by a carbon-silicon bond by a silicon atom and an oxygen atom;

General Formula (2):

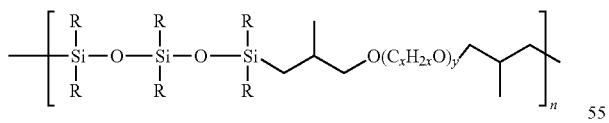

where each R represents the same groups as described above, and each of x, a, y, and n represent the same numbers as described above.

3. The method of manufacturing a polyether polysiloxane block copolymer composition according to claim 1, wherein the polyether polysiloxane block copolymer (A) includes at least oxypropylene units or oxybutylene units in a polyether portion thereof, and the number average molecular weight of the copolymer is in a range from 30,000 to 150,000.

4. The method of manufacturing a polyether polysiloxane block copolymer composition according to claim 1, wherein solvent (C) is a saturated hydrocarbon solvent substantially free of saturated hydrocarbons having an average number of carbon atoms greater than 12.

5. The method of manufacturing a polyether polysiloxane block copolymer composition according to claim 1, wherein the mass ratio of the polyether polysiloxane block copolymer (A) to the diluent (B) in the composition (A)/(B) is in a range of 10/90 to 60/40.

6. The method of manufacturing a polyether polysiloxane block copolymer composition according to claim 1, wherein the composition does not substantially contain an aromatic hydrocarbon-based solvent.

7. The method of manufacturing a polyether polysiloxane block copolymer composition according to claim 1, wherein the composition essentially does not contain low molecular weight siloxanes having 20 or fewer silicon atoms.

8. The method of manufacturing a polyether polysiloxane block copolymer composition according to claim 2, wherein the polyether polysiloxane block copolymer (A) has General Formula (2), and which is obtained by hydrosilylation reaction where each X of organopolysiloxane i) is a hydrogen atom and where polyether compound ii) has a carbon-carbon double bond at both terminals on a molecular chain.

9. The method of manufacturing a polyether polysiloxane block copolymer composition according to claim 1, wherein the polyether polysiloxane block copolymer (A) has intramolecular component units expressed by General Formula (1'):

(1')

where each R independently represents a monovalent hydrocarbon group having 1 to 9 carbon atoms without an aliphatic unsaturated bond, x represents a number from 2 to 4, a represents a number from 1 to 200, y is a number in the range from 400 to 5000, and n represents a number that is at least 2, and which is obtained by condensation reaction where each X of organopolysiloxane i) represents a reactive group selected from the group consisting of hydroxyl groups, alkoxy groups, dimethylamino groups, hydrogen, halogens, carbamate groups, and other leaving groups and where polyether compound ii) is expressed by General Formula (9):

HO—$(C_xH_{2x}O_y)$—H (9)

where x represents a number from 2 to 4, and y is a number in the range from 400 to 5000.

10. A method of manufacturing a polyurethane foam-forming composition, the method comprising:
(I) obtaining (A) a polyether polysiloxane block copolymer by reacting i) and ii) in the presence of (C) a saturated hydrocarbon solvent with an average number of carbon atoms of 6 to 11:
i) an organopolysiloxane having a reactive group on both terminals of the molecule, expressed by the following structural formula:

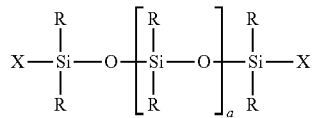

where a represents a number from 1 to 200, each R independently represents a monovalent hydrocarbon group having from 1 to 9 carbon atoms and not having an aliphatic unsaturated bond, and each X represents a reactive group selected from the group consisting of hydroxyl groups, alkoxy groups, dimethylamino groups, hydrogen atoms, halogen atoms, carbamate groups, and other leaving groups; and ii) a polyether compound having a condensation reactive or hydrosilylation reactive group at both ends of the molecular chain;

(II) either after or during step (I), replacing solvent (C) with (B) a (poly) glycol or a polyglycol derivative as a diluent to provide (d) a polyether polysiloxane block copolymer composition; and (III) mixing at least one raw material selected from the group consisting of (a) a polyol, (b) a polyisocyanate, and (c) a catalyst with (d) the polyether polysiloxane block copolymer composition.

11. A method of manufacturing a polyurethane foam, the method comprising:

(I) obtaining (A) a polyether polysiloxane block copolymer by reacting i) and ii) in the presence of (C) a saturated hydrocarbon solvent with an average number of carbon atoms of 6 to 11:

i) an organopolysiloxane having a reactive group on both terminals of the molecule, expressed by the following structural formula:

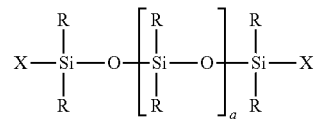

where a represents a number from 1 to 200, each R independently represents a monovalent hydrocarbon group having from 1 to 9 carbon atoms and not having an aliphatic unsaturated bond, and each X represents a reactive group selected from the group consisting of hydroxyl groups, alkoxy groups, dimethylamino groups, hydrogen atoms, halogen atoms, carbamate groups, and other leaving groups; and ii) a polyether compound having a condensation reactive or hydrosilylation reactive group at both ends of the molecular chain;

(II) either after or during step (I), replacing solvent (C) with (B) a (poly) glycol or a polyglycol derivative as a diluent to provide (d) a polyether polysiloxane block copolymer composition; and (III) reacting (a) a polyol and (b) a polyisocyanate in the presence of (c) a catalyst and (d) the polyether polysiloxane block copolymer composition.

* * * * *